(12) United States Patent
Kitani et al.

(10) Patent No.: US 10,521,050 B2
(45) Date of Patent: Dec. 31, 2019

(54) PROJECTION VIDEO DISPLAY APPARATUS AND VIDEO DISPLAY METHOD

(71) Applicant: MAXELL, LTD., Kyoto (JP)

(72) Inventors: Mitsuhiro Kitani, Tokyo (JP); Takashi Matsubara, Tokyo (JP); Takehiro Niikura, Tokyo (JP); Shinichi Obata, Tokyo (JP); Takashi Kanemaru, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/524,704

(22) PCT Filed: Nov. 13, 2014

(86) PCT No.: PCT/JP2014/080120
§ 371 (c)(1),
(2) Date: May 5, 2017

(87) PCT Pub. No.: WO2016/075796
PCT Pub. Date: May 19, 2016

(65) Prior Publication Data
US 2017/0322672 A1    Nov. 9, 2017

(51) Int. Cl.
*H04N 9/31*    (2006.01)
*G06F 3/038*   (2013.01)
(Continued)

(52) U.S. Cl.
CPC .......... *G06F 3/0418* (2013.01); *G06F 3/0386* (2013.01); *G06F 3/0425* (2013.01);
(Continued)

(58) Field of Classification Search
CPC .... G06F 3/0386; G06F 3/0418; G06F 3/0425; G06F 3/0482; G06F 3/0488; G06F 2203/04106; H04N 9/3185; H04N 9/3194
(Continued)

(56) References Cited

U.S. PATENT DOCUMENTS 5,528,263 A * 6/1996 Platzker .................. G06F 3/011
345/156
2005/0253807 A1   11/2005 Hohmann et al.
(Continued)

FOREIGN PATENT DOCUMENTS

CN    102650804 A    8/2012
JP    2005-327262 A  11/2005
(Continued)

OTHER PUBLICATIONS

International Search Report for WO 2016/075796 A1, dated Dec. 12, 2014.
(Continued)

*Primary Examiner* — Prabodh H Dharia
(74) *Attorney, Agent, or Firm* — Volpe and Koenig, P.C.

(57) ABSTRACT

An operation target device projects a display video onto a projection surface, which is captured by a camera. An operation detectable region specifying unit specifies respective regions where an operation is detectable and is undetectable based on image data captured by the camera. Finger and pen contact position detection units detect the operation to the operation object based on the image data captured by the camera. The operation target device displays the display video so that the region where the operation to the operation object is detectable, which is specified by the operation detectable region specifying unit, is distinguished from the region where the operation to the operation object is undetectable. In addition, the operation target device changes a display position of the operation object so that the operation object is displayed within a range of the region where the operation to the operation object is detectable.

6 Claims, 16 Drawing Sheets

(51) Int. Cl.
*G06F 3/041* (2006.01)
*G06F 3/042* (2006.01)
*G06F 3/0354* (2013.01)
*G06F 3/0481* (2013.01)
*G06F 3/0482* (2013.01)
*G06F 3/0488* (2013.01)

(52) U.S. Cl.
CPC ......... *H04N 9/3185* (2013.01); *H04N 9/3194* (2013.01); *G06F 3/0482* (2013.01); *G06F 3/0488* (2013.01); *G06F 3/04817* (2013.01); *G06F 2203/04106* (2013.01)

(58) Field of Classification Search
USPC ........... 345/56–184; 715/8; 463/25; 348/143
See application file for complete search history.

(56) References Cited

U.S. PATENT DOCUMENTS

| | | | |
|---|---|---|---|
| 2006/0192899 A1* | 8/2006 | Ogita | H04N 9/3105 348/744 |
| 2008/0075368 A1* | 3/2008 | Kuzmin | G06F 3/04883 382/187 |
| 2008/0259053 A1* | 10/2008 | Newton | G06F 3/0421 345/175 |
| 2010/0026624 A1* | 2/2010 | Bell | G06F 3/011 345/156 |
| 2010/0214266 A1* | 8/2010 | Koshihara | G06F 3/044 345/174 |
| 2010/0302205 A1* | 12/2010 | Noma | G06F 3/041 345/174 |
| 2011/0115745 A1* | 5/2011 | Cabrera Cordon | G06F 3/0488 345/175 |
| 2011/0249121 A1* | 10/2011 | Taillade | G01V 8/14 348/153 |
| 2012/0019460 A1 | 1/2012 | Matsubara et al. | |
| 2012/0069180 A1* | 3/2012 | Kawamura | G09F 19/18 348/143 |
| 2012/0218294 A1 | 8/2012 | Nimura et al. | |
| 2012/0314191 A1* | 12/2012 | Fujimori | H04M 1/0272 353/70 |
| 2013/0165215 A1* | 6/2013 | Arezina | G07F 17/3206 463/25 |
| 2013/0194174 A1 | 8/2013 | Bondan et al. | |
| 2015/0022467 A1* | 1/2015 | Takayama | G06F 3/03545 345/173 |
| 2015/0067504 A1* | 3/2015 | Kim | G06F 9/453 715/708 |
| 2015/0317037 A1* | 11/2015 | Suzuki | G06F 3/0425 345/175 |
| 2015/0332075 A1* | 11/2015 | Burch | G06K 7/10821 345/156 |
| 2015/0356938 A1* | 12/2015 | Yoshioka | G09G 3/002 345/206 |
| 2016/0004431 A1* | 1/2016 | Bernstein | G06F 3/0488 345/173 |

FOREIGN PATENT DOCUMENTS

| | | |
|---|---|---|
| JP | 2008-059283 A | 3/2008 |
| JP | 2012-027515 A | 2/2012 |
| JP | 2012-094085 A | 5/2012 |
| JP | 2013-045217 A | 3/2013 |
| JP | 2013-109538 A | 6/2013 |
| JP | 2013-152529 A | 8/2013 |
| JP | 2014-120023 A | 6/2014 |
| WO | 2016/021022 A1 | 2/2016 |

OTHER PUBLICATIONS

Chinese Office Action dated Jun. 20, 2019 for the Chinese Patent Application No. 201480082763.3.

* cited by examiner

FIG. 3
(a)
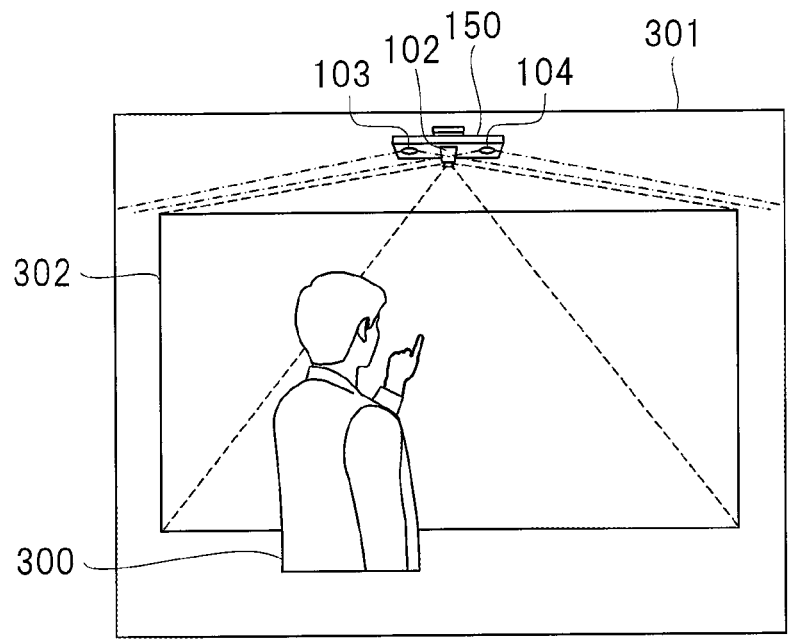
(b)
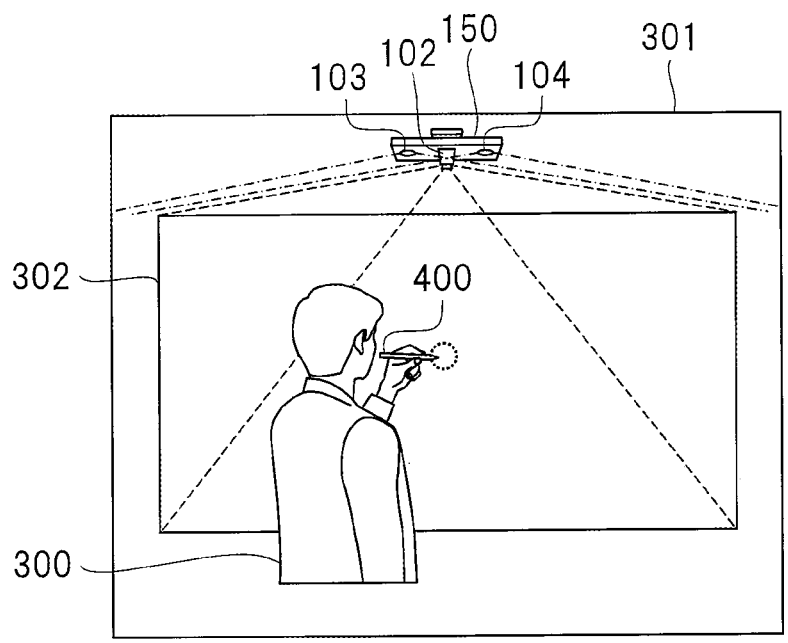

FIG. 4
(a)
STRUCTURE OF ELECTRONIC PEN
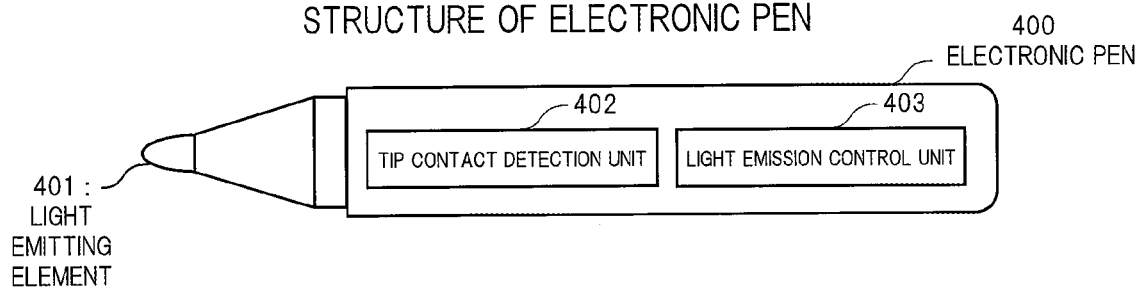
(b)
STATE OF ELECTRONIC PEN WHOSE TIP IS IN NON-CONTACT
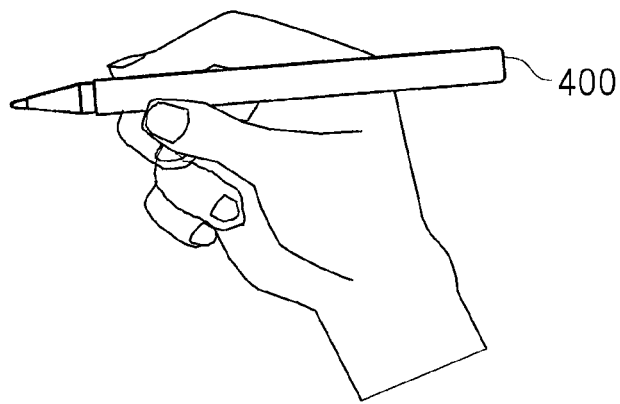
(c)
STATE OF ELECTRONIC PEN WHOSE TIP IS IN CONTACT
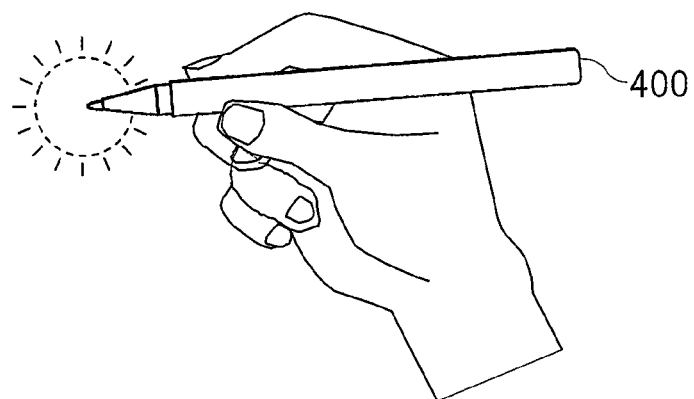

FIG. 7

| INDEX NUMBER | FINGER OPERATION DETECTION ACCURACY | LUMINANCE LEVEL | REFERENCE LUMINANCE DIFFERENCE | DISPLAY COLOR |
|---|---|---|---|---|
| 1 | 0 | 200 to 255 | +60 OR MORE | |
| 2 | 1 | 150 to 199 | +40 to +59 | |
| 3 | 2 | 100 to 149 | +20 to +39 | |
| 4 | 3 | 50 to 99 | +0 to +19 | |

FIG. 8
(a)
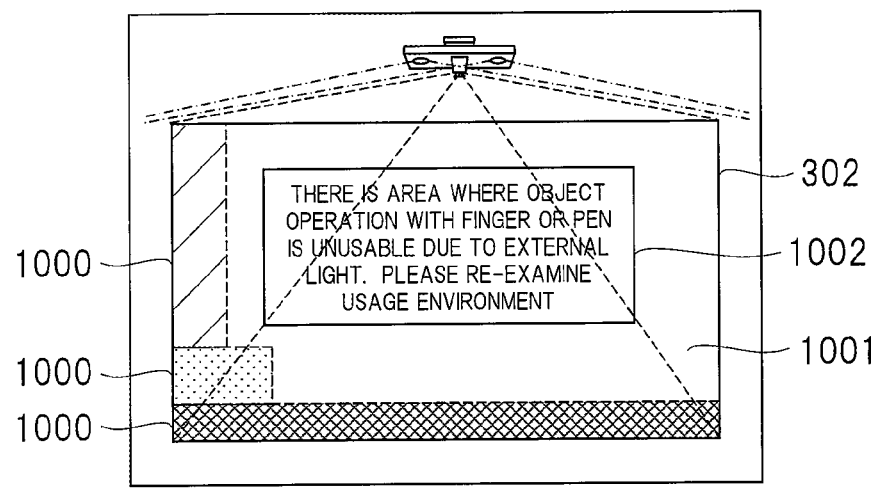
(b)
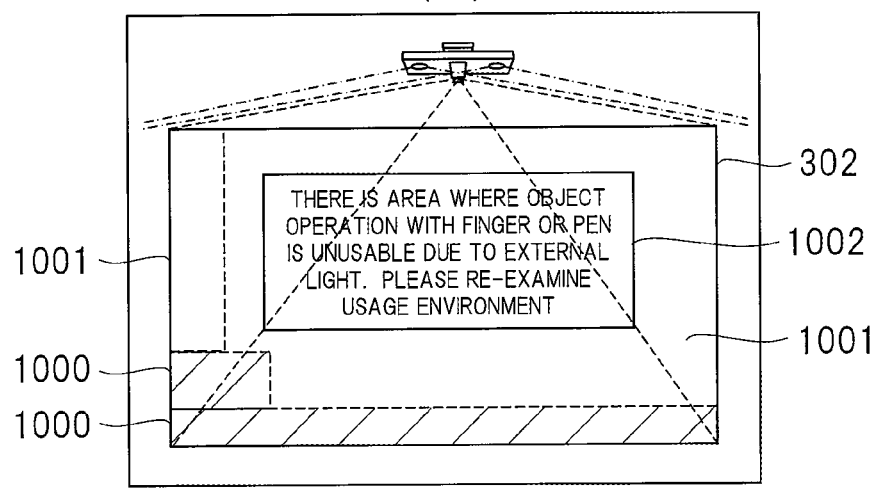
(c)
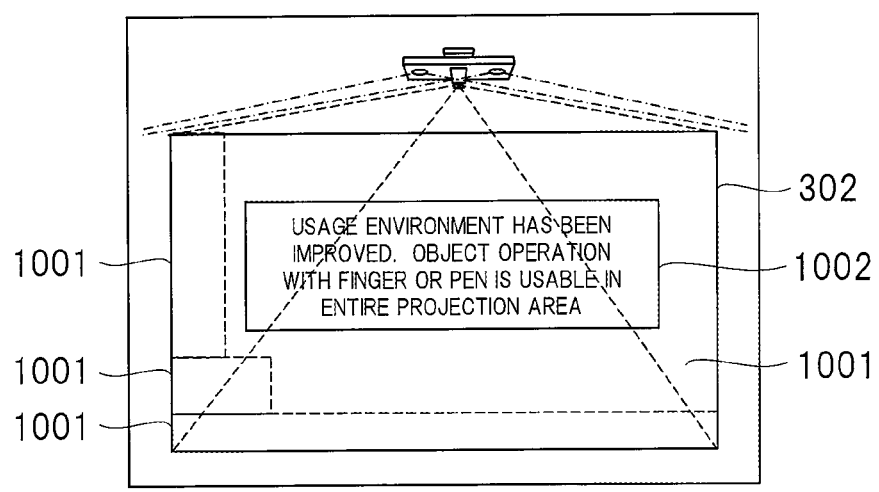

FIG. 9
(a)
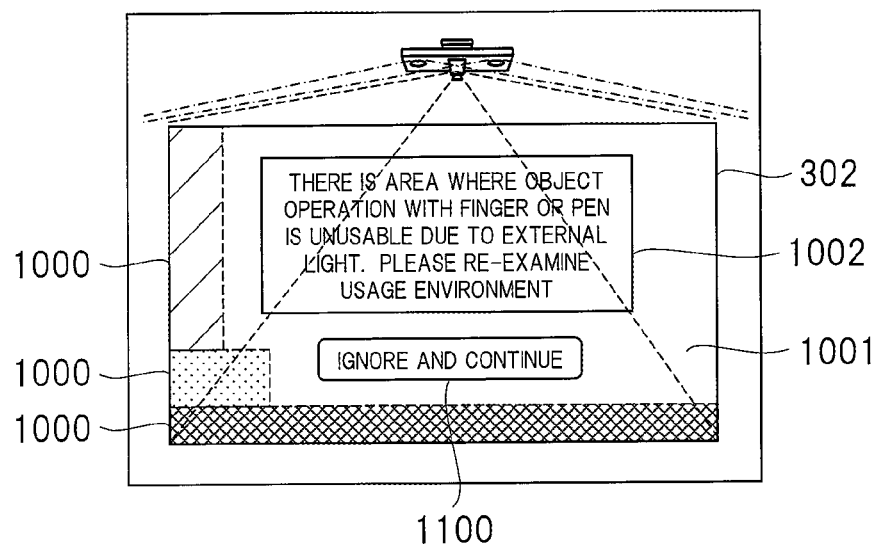
(b)
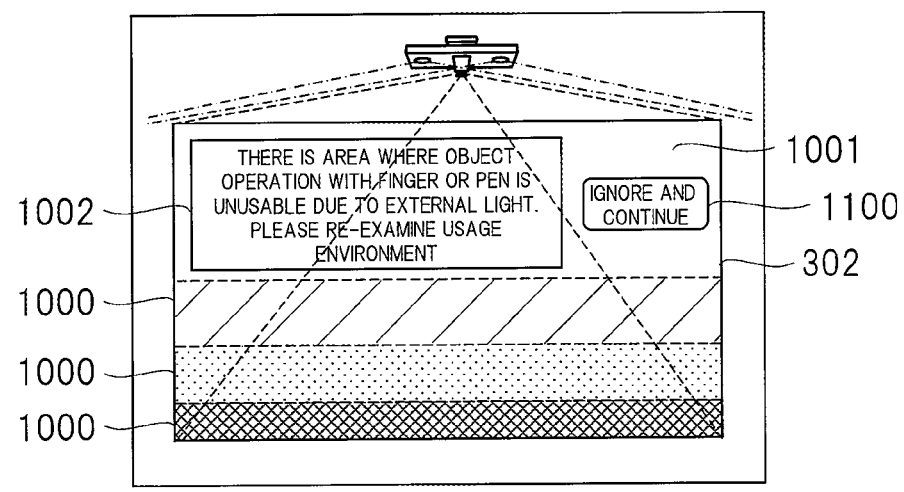

FIG. 10
(a)
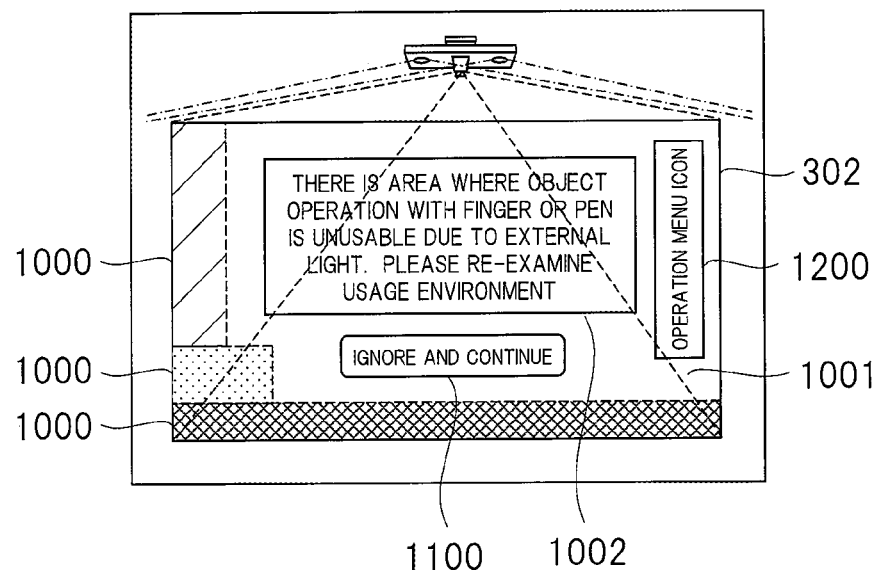
(b)
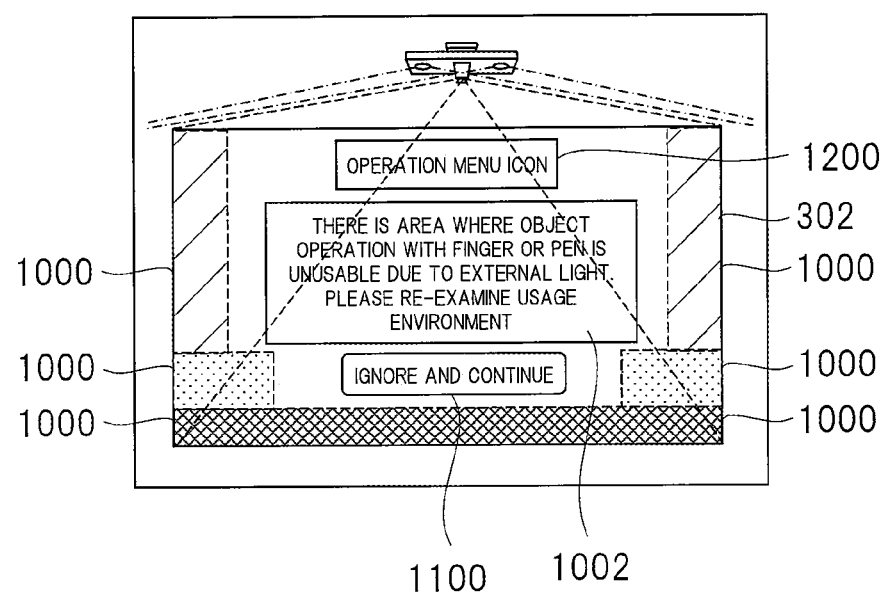

FIG. 11
(a)
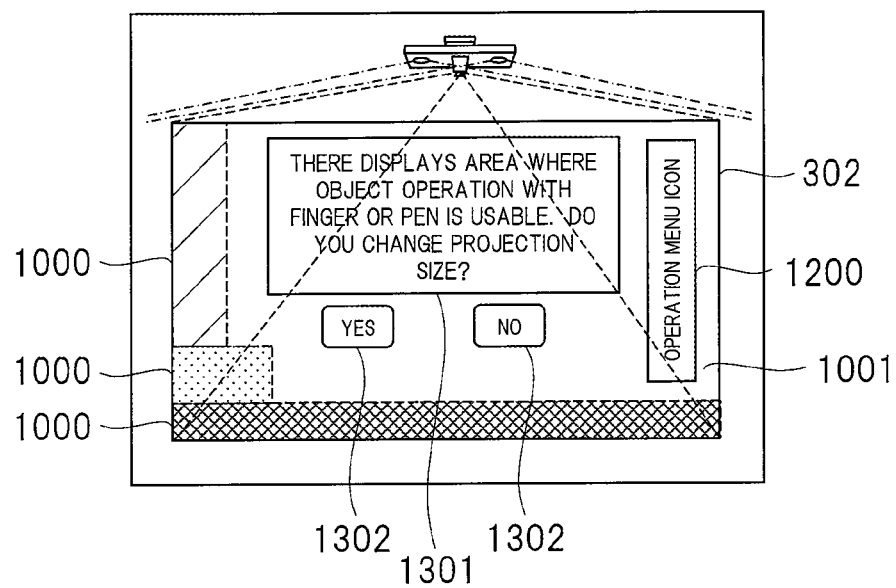
(b)
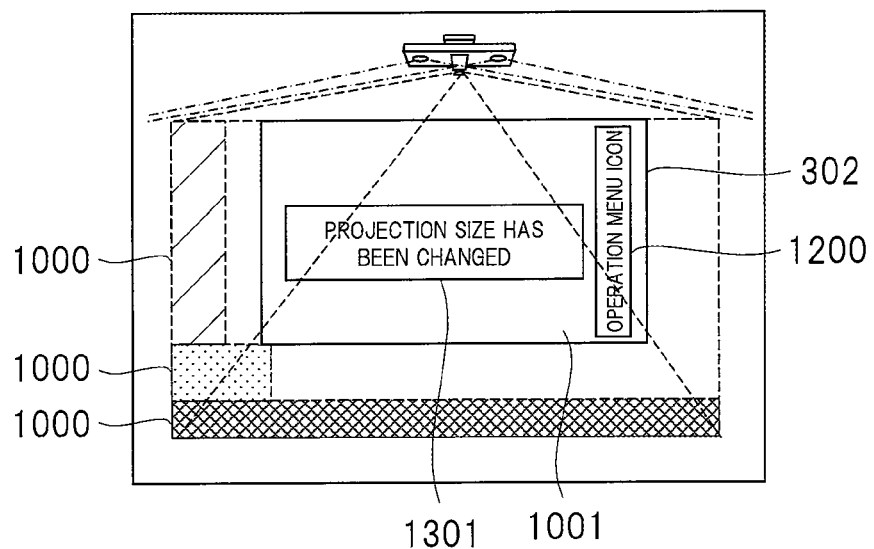

FIG. 16
(a)
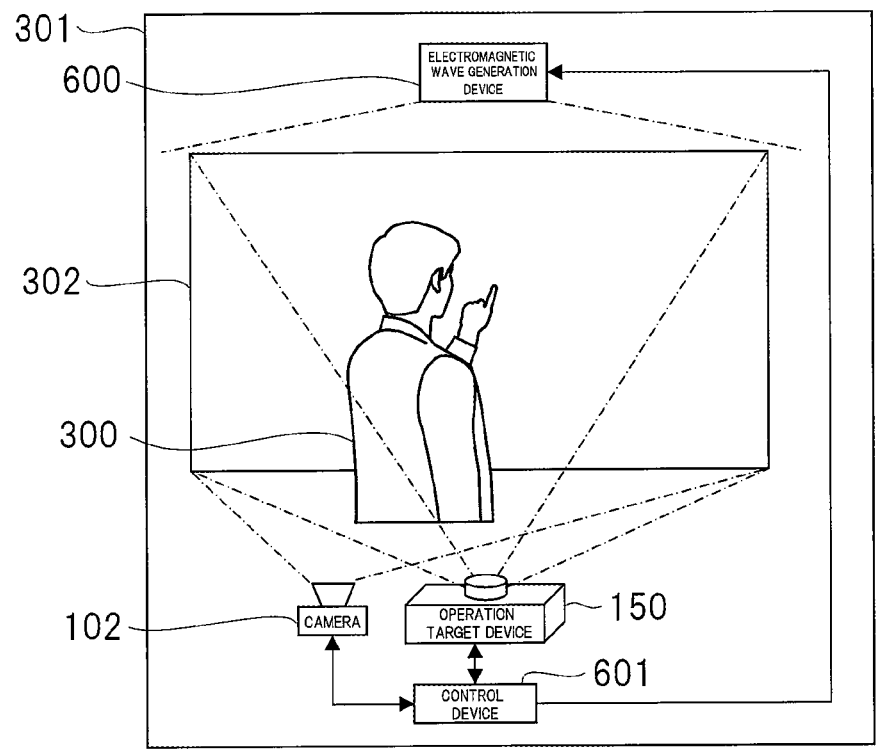
(b)
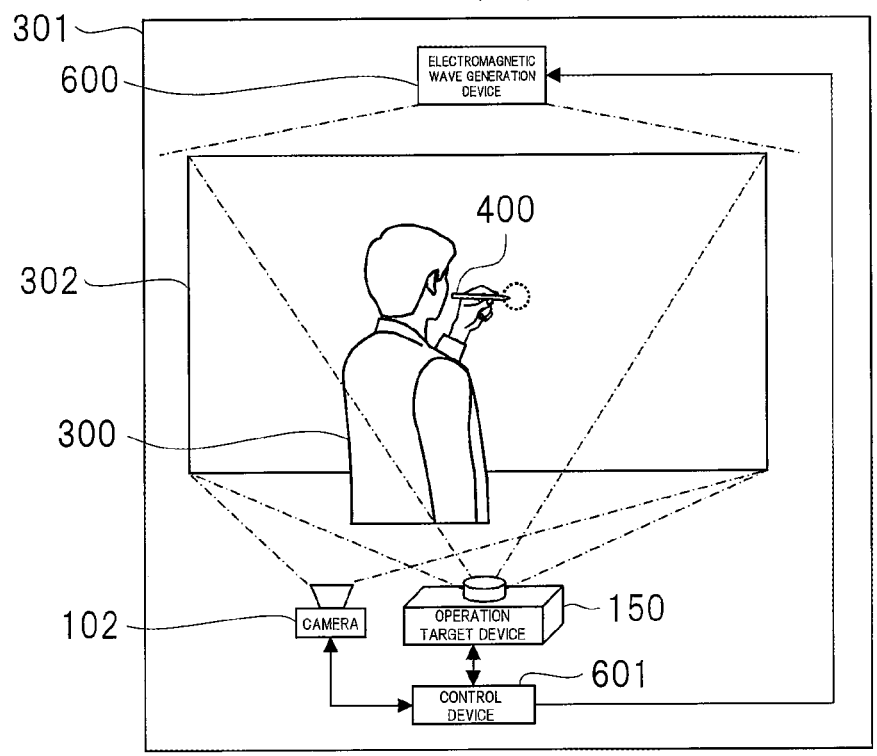

PROJECTION VIDEO DISPLAY APPARATUS AND VIDEO DISPLAY METHOD

TECHNICAL FIELD

The present invention relates to a projection video display apparatus and a video display method, and particularly relates to a technique effective in improving a user operation with a finger, an electronic pen, or the like.

BACKGROUND ART

Many techniques have been devised with respect to an apparatus which displays a video by projection. For example, an operation detection apparatus which "detects operation information without using special equipment" and a program thereof are described as a purpose in Patent Document 1.

Further, as means for achieving the purpose, Patent Document 1 discloses "an operation detection apparatus used together with illumination means and image capture means, the apparatus including: means for causing the image capture means to capture an operator with the operator illuminated by the illumination means; means for detecting a region of a specific part of the operator based on image data of the operator obtained by the image capture means; means for extracting a portion of a shadow from the detected region of the specific part of the operator; and means for detecting a plurality of segments each having an edge forming a straight line from the extracted portion of the shadow, detecting a point where the detected segments intersect one another at an acute angle, and detecting the point of intersection as a finger pointing position within the region of the specific part of the operator".

RELATED ART DOCUMENTS

Patent Documents

Patent Document 1: Japanese Patent Application Laid-Open No. 2008-59283

SUMMARY OF THE INVENTION

Problems to be Solved by the Invention in the technique of the aforementioned Patent Document 1, a finger operation and a finger position are detected based on a shadow of a finger which has appeared by irradiating the finger with a light or the like. Accordingly, if the shadow of the finger has lost its shape due to an influence of surrounding light such as external light, the finger operation and the finger position may become undetectable.

For a user, a region where the user operation is undetectable due to an influence of external light or the like cannot be grasped. Therefore, there is the problem that the user himself/herself cannot improve a usage environment.

An object of the present invention is to provide a technique capable of correcting false recognition and non-detection of a user operation due to an influence of external light or the like.

The above and other objects and novel characteristics of the present invention will be apparent from the description of the present specification and the accompanying drawings.

Means for Solving the Problems

The following is a brief description of an outline of the typical invention disclosed in the present application.

Namely, a typical projection video display apparatus is a video display apparatus which is controllable by an operation to an operation object projected onto a projection surface. The projection video display apparatus includes: a projection unit; an image capture unit; an operable region specifying unit; and a detection unit.

The projection unit projects a display video onto the projection surface. The image capture unit captures the projection surface. The operable region specifying unit specifies each of a first region where the operation to the operation object is detectable and a second region where the operation to the operation object is undetectable in a range in which the display video is projected on the projection surface, based on image data captured by the image capture unit. The detection unit detects the operation to the operation object based on the image data captured by the image capture unit.

Then, the projection unit can project a display video in which the first region where the operation to the operation object is detectable, which is specified by the operable region specifying unit, is displayed so as to be distinguished from the second region. Also, the projection unit changes a display position of the operation object so that the operation object is displayed within a range of the first region where the operation to the operation object is detectable.

In particular, when an input video input from outside is projected from the projection unit and displayed, the projection unit further changes a range occupied by the input video in the display video based on the first region specified by the operable region specifying unit.

In addition, the operable region specifying unit specifies each of the first region where the operation to the operation object is detectable and the second region where the operation to the operation object is undetectable, based on a luminance level of image data of the projection surface captured by the image capture unit.

Effects of the Invention

The effects obtained by the typical invention disclosed in the present application will be briefly described below.

It is possible to improve the user convenience.

BRIEF DESCRIPTIONS OF THE DRAWINGS

FIG. 3 is an explanatory view illustrating an example of an overview of the operation detection apparatus illustrated in FIG. 1 and an appearance of a user who operates the operation detection apparatus;

FIG. 4 is an explanatory view illustrating a configuration example of an electronic pen included in the operation detection apparatus illustrated in FIG. 1;

FIG. 7 is an explanatory view illustrating a configuration example of an operation detection determination table used in a process in step S101 in the flowchart illustrated in FIG. 6;

FIG. 8 is an explanatory view illustrating an example of display of a region where a finger operation is undetectable and a guide display to a user by the operation detection apparatus illustrated in FIG. 1;

FIG. 9 is an explanatory view illustrating another example of display of a region where a finger operation is undetectable and a guide display to a user by the operation detection apparatus illustrated in FIG. 1;

FIG. 10 is an explanatory view illustrating an example of display of a region where a finder operation is undetectable, a guide display to a user, and display of an operation menu icon by the operation detection apparatus illustrated in FIG. 1;

FIG. 11 is an explanatory view illustrating an example of display of a region where a finger operation is undetectable, a change in a projection range, and display of an operation menu icon by the operation detection apparatus illustrated in FIG. 1;

FIG. 16 is an explanatory view illustrating a configuration example of an operation detection apparatus according to a fifth embodiment.

DESCRIPTIONS OF THE PREFERRED EMBODIMENTS

Figure 1:
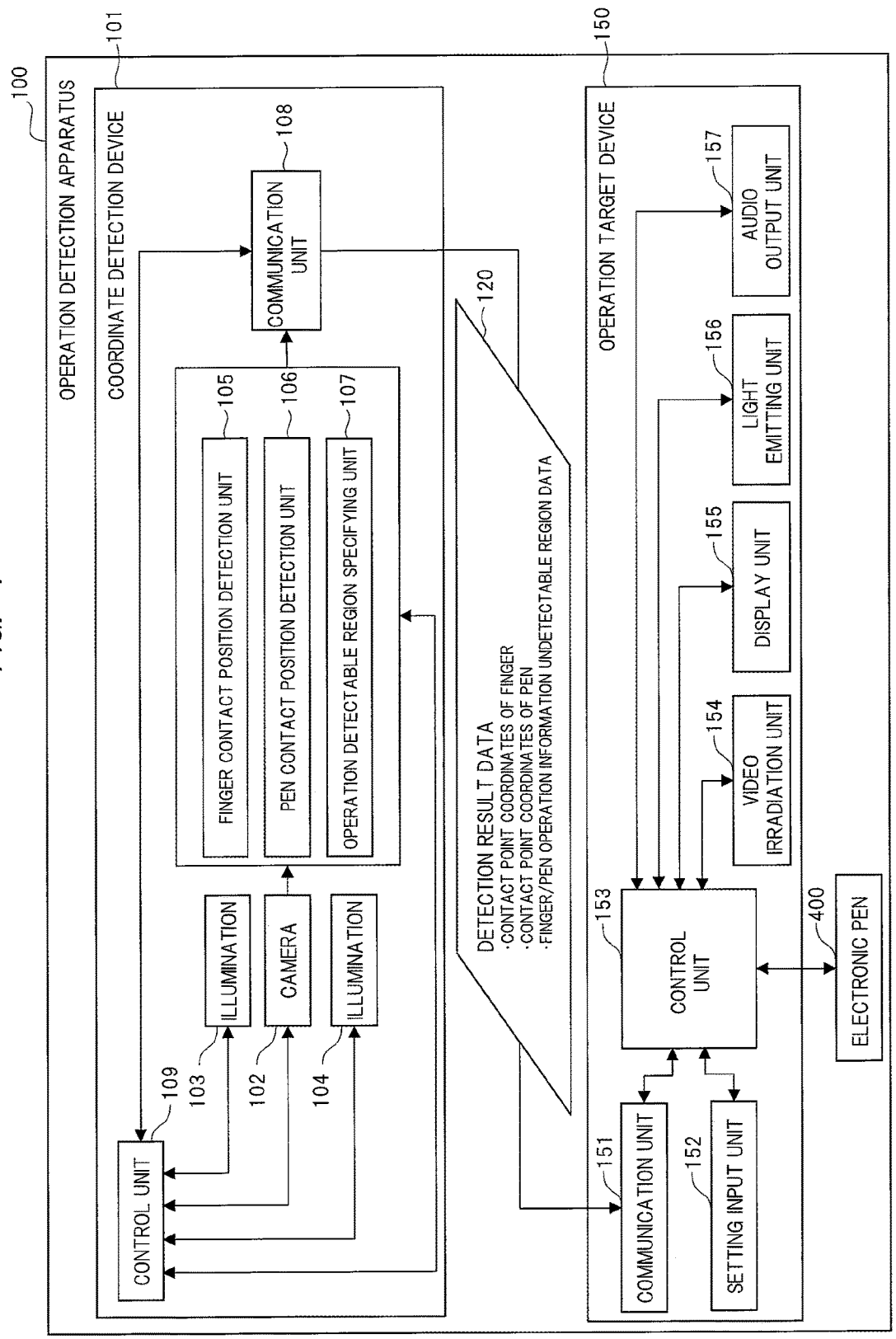
FIG. 1 is an explanatory view illustrating a configuration example of an operation detection apparatus according to a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above. Also, components having the same function are denoted by the same reference characters throughout the drawings for describing the embodiments, and the repetitive description thereof is omitted.

Hereinafter, embodiments will be described in detail.

First Embodiment

<Configuration Example of Operation Detection Apparatus>

FIG. 1 is an explanatory view illustrating a configuration example of an operation detection apparatus 100 according to the first embodiment.

The operation detection apparatus 100 which is a projection video display apparatus includes a coordinate detection device 101, an operation target device 150, and an electronic pen 400 as illustrated in FIG. 1. The coordinate detection device 101 is configured of a camera 102, illuminations 103 and 104, a finger contact position detection unit 105, a pen contact position detection unit 106, an operation detectable region specifying unit 107, a communication unit 108, and a control unit 109.

The camera 102 serving as an image capture unit is configured of an image sensor, a lens, a filter and others, and captures an image. Each of the two illuminations 103 and 104 is configured of a light emitting diode, a circuit board, a lens and others (not illustrated).

The illuminations 103 and 104 each irradiate a region to be captured by the camera 102. The illuminations 103 and 104 may be configured to blink so as to be alternately turned on, other than being always turned on.

In addition to this, both the illumination 103 and the illumination 104 may be temporarily turned off when lighting is switched therebetween. Alternatively, the illumination 103 and the illumination 104 may be configured to blink at the same timing.

Also, light from the illuminations 103 and 104 may be invisible. For example, the camera 102 and the illuminations 103 and 104 may be respectively configured of an infrared camera and infrared illuminations so that the process of detecting a contact position of a finger is performed by capturing an infrared image. If the camera 102 and the illuminations 103 and 104 are respectively configured of an infrared camera and infrared illuminations, a filter may be added to the configuration of the infrared camera so as to capture an infrared image while blocking a part or the whole of the light other than that in an infrared region.

The finger contact position detection unit 105 serving as a detection unit detects a contact position of a finger from image data captured by the camera 102. The pen contact position detection unit 106 similarly serving as a detection unit detects a contact position of the electronic pen 400 from the image data captured by the camera 102.

The detection process by the finder contact position detection unit 105 and the pen contact position detection unit 106 is performed based on software in a program format by an electronic circuit and the like constituting the finder contact position detection unit 105 and the pen contact position detection unit 106.

Contact position information detected by the finger contact position detection unit 105 or the pen contact position detection unit 106 is processed as operation information of the finger or the electronic pen 400 by a control unit 153.

Hereinafter, in the present embodiment, "finger" is described as a representative for an object to be detected. An object whose contact position is to be detected by the finger contact position detection unit 105 may be a pen-shaped object such as a pointing stick in addition to the finger. Further, it is sufficient if at least one of the finger contact position detection unit 105 and the pen contact position detection unit 106 is provided in this configuration, and it is not always necessary to provide both of them.

The operation detectable region specifying unit 107 serving as an operable region specifying unit specifies a region where operation information of the finger or the electronic pen 400 is detectable, from the image data captured by the camera 102. The region where the operation information is detectable serves as a first region.

The region specifying process is performed based on software in a program format by an electronic circuit and the like constituting the operation detectable region specifying unit 107. Note that a technique for specifying the region will be described below with reference to FIGS. 6 and 7.

The communication unit 108 is an interface configured of a network connection, a USB (Universal Serial Bus) connection, an ultrasonic unit, an infrared communication device and others, and communicating with a communication unit 151 included in the operation target device 150.

This communication unit 108 performs communication of detection result data 120 or the like. The detection result data 120 is information which is output from the coordinate detection device 101 to the operation target device 150 via the communication unit 108. Specific examples thereof include contact point coordinates of the finger, contact point coordinates of the electronic pen 400, and finger/pen operation information undetectable region data.

The finger/pen operation information undetectable region data includes information representing a region where operation information of a finger/electronic pen is undetectable, that is, Positional information (for example, coordinate data) representing a region where an operation with a finger/electronic pen is unusable and information representing a degree related to a detection accuracy in a case where operation information of a finger/pen is undetectable. A region where an operation is unusable serves as a second region.

The control unit 109 controls the camera 102, the illumination 103, the illumination 104, the finger contact position detection unit 105, the pen contact position detection unit 106, the operation detectable region specifying unit 107, and the communication unit 108. The control unit 109 is configured of, for example, a CPU (Central Process Unit), and the control unit 109 performs control based on the software in a program format.

Next, the operation target device 150 serving as a projection unit is configured of the communication unit 151, a setting input unit 152, the control unit 153, a video irradiation unit 154, a display unit 155, a light emitting unit 156, and an audio output unit 157.

The operation target device 150 is, for example, a projector that displays drawing information of the finger of a user and performs operation, setting, and control of the projector itself by receiving the detection result data 120 transmitted from the communication unit 108 of the coordinate detection device 101.

The communication unit 151 is an interface configured of a network connection, a USB (Universal Serial Bus) connection, an ultrasonic unit, an infrared communication device and others like the communication unit 108, and communicating with the coordinate detection device 101. The setting input unit 152 is an interface configured of a button, a touch panel and others and receiving a user input.

The control unit 153 configured of, for example, a CPU and controls the communication unit 151, the setting input unit 152, the video irradiation unit 154, the display unit 155, the light emitting unit 156, the audio output unit 157, the electronic pen 400, and the like. The control unit 153 performs control based on the software in a program format.

The video irradiation unit 154 is configured of a light source lamp, a liquid crystal panel, a lens and others, and irradiates a video onto a projection surface 301 illustrated in FIG. 3. The video irradiated onto the projection surface 301 is output from a personal computer (not illustrated) or the like connected to the operation target device 150.

Here, if light in a visible region having a wavelength shorter than a predetermined wavelength is set as light irradiated from the video irradiation unit 154 and light in an invisible region having a wavelength longer than the predetermined wavelength is set as light irradiated from the illuminations 103 and 104, the user can visually recognize only the light irradiated from the video irradiation unit 154. A band-pass filter or the like may be used for controlling the wavelength of the irradiated light.

The display unit 155 is configured of a liquid crystal display, an electronic circuit which drives the liquid crystal display and others, and displays information such as characters and images. The light emitting unit 156 is configured of a light emitting element, an electronic circuit which drives the light emitting element and others, and creates states such as lighting, blinking, and non-lighting.

The audio output unit 157 is configured of a speaker, an amplification circuit which amplifies a signal or the like to be output to the speaker and others, and outputs various audios such as a voice message and a sound effect. The electronic pen 400 is configured of a light emitting element, an electronic circuit which drives the light emitting element and others.

As a specific process of the control unit 153, the control unit 153 performs video projection control to the video irradiation unit 154 so as to be able to distinguish the region where an operation with a finger is detectable and the region where an operation with a finger is undetectable. Alternatively, the video projection control may be performed so as to be able to distinguish the regions in n levels in accordance with the degree of detection accuracy instead of the two levels of the region where an operation with a finger is detectable and the region where an operation with a finger is undetectable. Here, n is 2, 3, . . . n.

Furthermore, the control unit 153 performs the video projection control to the video irradiation unit 154 so that a menu icon, a user message and the like are displayed on the projection surface 301 while avoiding the region where an operation with a finger is undetectable. In addition, the control unit 153 performs control to adjust the size of a video projected onto the projection surface 301 to the video irradiation unit 154 so as to eliminate the region where an operation with a finger is undetectable.

Note that functional block units such as the camera 102, the illuminations 103 and 104, the finger contact position detection unit 105, the pen contact position detection unit 106, the operation detectable region specifying unit 107, the communication unit 108, and the control unit 109 are independent of one another in FIG. 1, but may be constituted of one or plural components, as needed.

For example, the finger contact position detection unit 105, the pen contact position detection unit 106, and the operation detectable region specifying unit 107 may be configured to perform the processes thereof by one or plural central process units (CPUs) or the like.

Also, in FIG. 1, the coordinate detection device 101 is configured to include all functional block units such as the camera 102, the illuminations 103 and 104, the finger contact position detection unit 105, the pen contact position detection unit 106, the operation detectable region specifying unit 107, the communication unit 108, and the control unit 109.

Similarly, the operation target device 150 is configured to include all functional block units such as the communication unit 151, the setting input unit 152, the control unit 153, the video irradiation unit 154, the display unit 155, the light emitting unit 156, and the audio output unit 157.

Figure 2:
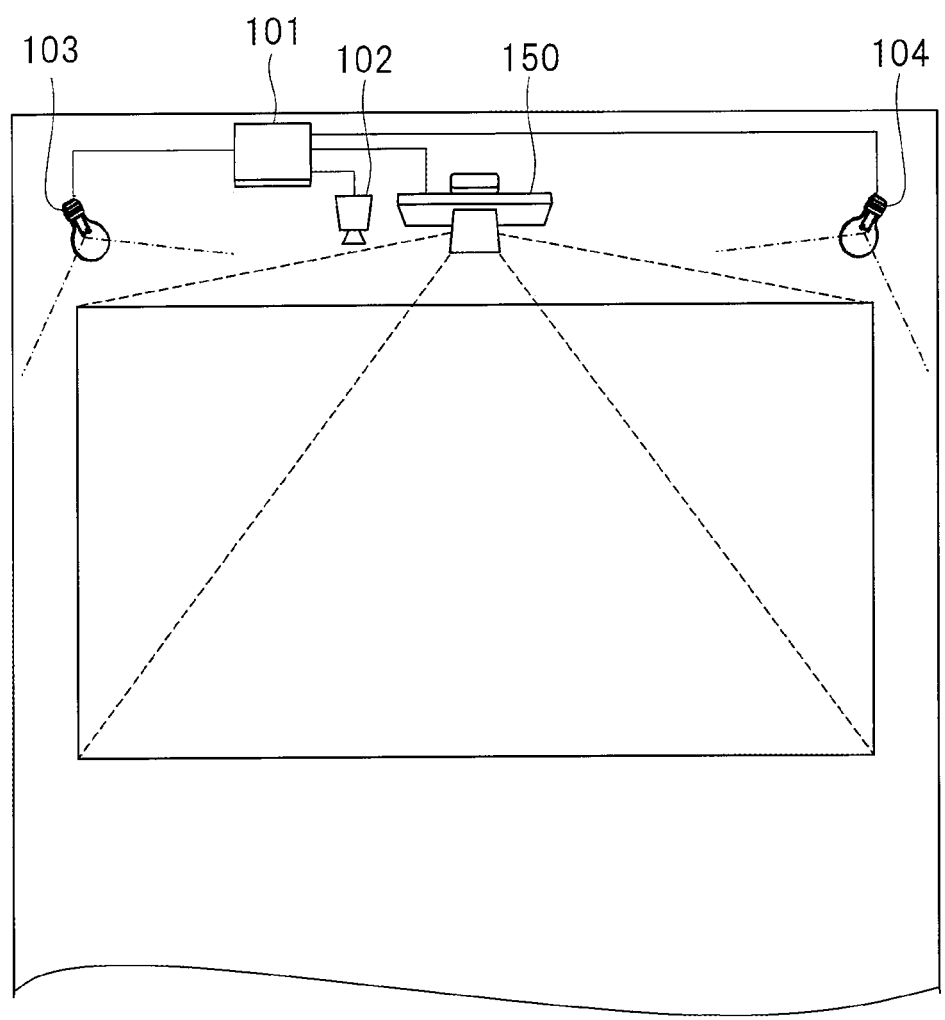
FIG. 2 is an explanatory view illustrating another configuration example of the operation detection apparatus illustrated in FIG. 1.

However, the aforementioned configuration may be replaced with a configuration in which one or plural components are formed outside and are connected via a network connection, a USE connection, or the like as illustrated in FIG. 2 to be described below.

<Another Configuration Example of Operation Detection Apparatus>

FIG. 2 is an explanatory view illustrating another configuration example of the operation detection apparatus 100 illustrated in FIG. 1.

In this case, the operation detection apparatus 100 has a configuration in which each of the camera 102 and the illuminations 103 and 104 is individually provided independently of the coordinate detection device 101 as illustrated in FIG. 2.

As still another configuration example of the operation detection apparatus 100, the coordinate detection device 101 and the operation target device 150 may be configured as one device.

<Overview and Operation Example of Operation Detection Apparatus>

FIG. 3 is an explanatory view illustrating an example of an overview of the operation detection apparatus 100 illustrated in FIG. 1 and an appearance of a user who operates the operation detection apparatus 100. FIG. 3(a) illustrates an example in a case where a user 300 performs an operation with his/her finger, and FIG. 3(b) illustrates an example in a case where the user 300 performs an operation with the electronic pen 400.

In FIG. 3, the camera 102 captures an image of a range indicated by a projection range 302 on a projection surface 301. Any of a wall, a screen, or a desk may be used as the projection surface 301.

When the user 300 touches the projection range 302 on the projection surface 301 with his/her finger as illustrated in FIG. 3(a), the finger contact position detection unit 105 in the operation detection apparatus 100 detects a contact position of the finger. Also, when the user 300 touches the projection range 302 on the projection surface 301 with the electronic pen 400 as illustrated in FIG. 3(b), the pen contact position detection unit 106 detects a contact position of the pen.

Further, the finger contact position detection unit 105 may have a function of detecting a shape and movement of the finger of the user from image data captured by the camera 102 when the user 300 has performed a gesture operation in the vicinity of the projection surface 301.

Information detected by the finger contact position detection unit 105 is transferred as the detection result data 120 to the operation target device 150 via the communication unit 108. Then, the control unit 153 controls the operation target device 150 in accordance with the detection result data 120.

In this manner, the contact position of the electronic pen or the finger with an operation surface can be correctly detected without a touch sensor or the like provided on the operation surface.

<Configuration Example of Electronic Pen>

FIG. 4 is an explanatory view illustrating a configuration example of the electronic pen 400 included in the operation detection apparatus 100 illustrated in FIG. 1. FIG. 4(a) illustrates an example of an appearance of the electronic pen 400. FIG. 4(b) illustrates an example in a case where a tip of the electronic pen 400 is not in contact, and FIG. 4(c) illustrates an example in a case where the tip of the electronic pen 400 is in contact.

The electronic pen 400 has a light emitting element 401 at its tip portion, and a tip contact detection unit 402 and a light emission control unit 403 are provided in a grip portion of the electronic pen 400 as illustrated in FIG. 4(a). The tip contact detection unit 402 is configured of, for example, a pressure sensitive sensor and an electronic circuit and determines whether the tip of the electronic pen 400 contacts a wall surface or the like.

The light emission control unit 403 performs control so that the light emitting element 401 is turned off when the tip of the electronic pen 400 is not in contact as illustrated in FIG. 4(b), based on a determination result of the tip contact detection unit 402.

Also, the light emission control unit 403 performs control so that the light emitting element 401 is turned on when the tip contact detection unit 402 determines that the tip of the electronic pen 400 is in contact as illustrated in FIG. 4(c).

Alternatively, control may be performed so that the light emitting element 401 enters different states between the time of contact and the time of non-contact. For example, control may be performed so that the light emitting element 401 is turned on when the tip of the electronic pen 400 is in contact and blinks when the tip of the electronic pen 400 is not in contact. Further, control may be performed so that the light emitting element 401 blinks at different frequencies between the time of contact and the time of non-contact.

Further, the camera 102 and the light emitting element 401 may be respectively configured of an infrared camera and an infrared illumination so that the process of detecting a contact position of the electronic pen 400 is performed by capturing an infrared image. Further, if the camera 102 and the light emitting element 401 are respectively configured of an infrared camera and an infrared illumination, a filter may be added to the configuration of the infrared camera so as to capture an infrared image while blocking a part or the whole of the light other than that in an infrared region.

Subsequently, a technique in which the operation detection apparatus 100 illustrated in FIG. 1 specifies a region where operation information of a finger is undetectable, presents the region to the user, and displays a guide for encouraging an improvement will be described.

<Influence of Irradiation of External Light>

Figure 5:
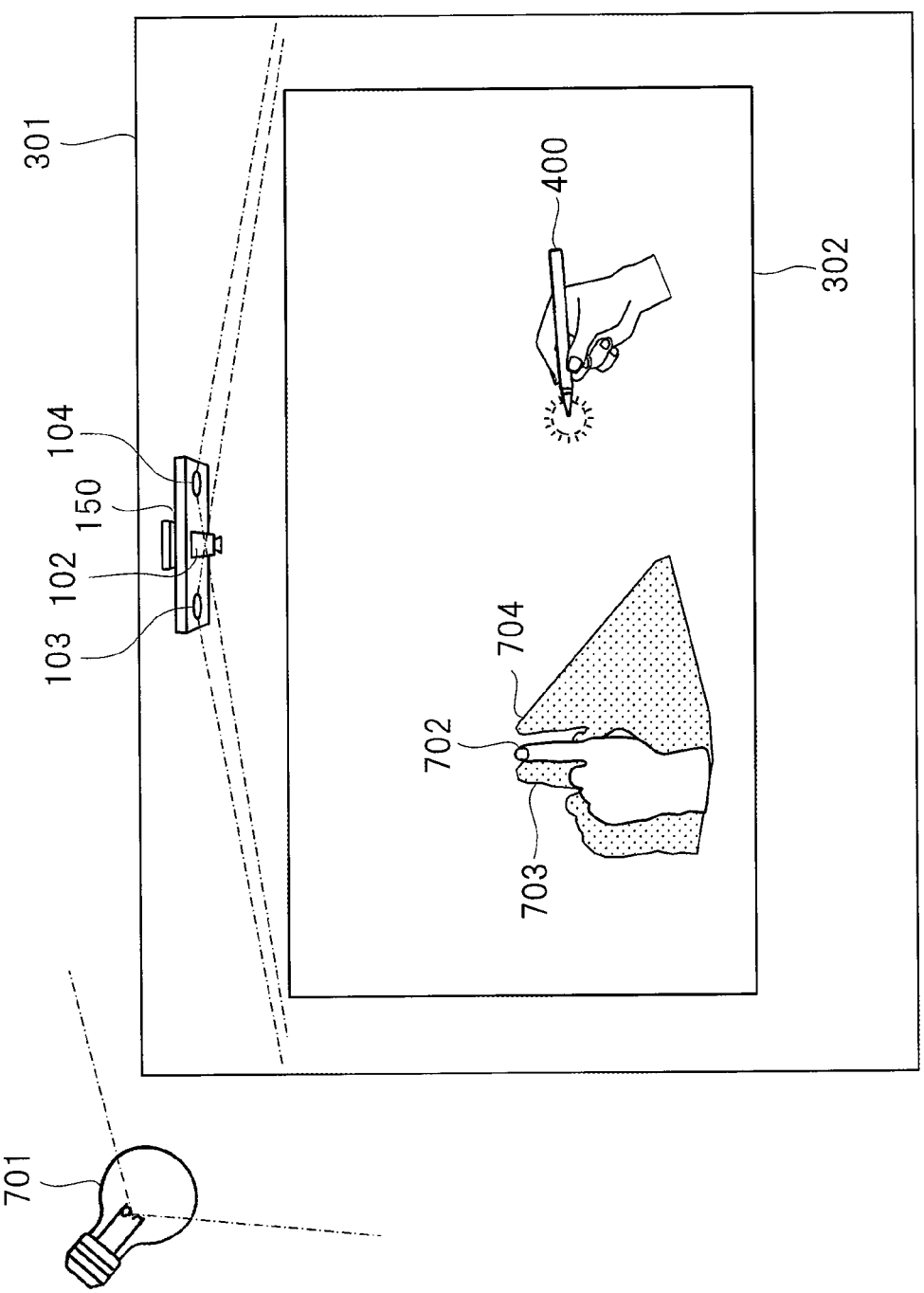
FIG. 5 is an explanatory view illustrating an example of the state where light from outside is irradiated onto a projection surface at the time of image projection, which has been examined by the inventors of the present invention.

FIG. 5 is an explanatory view illustrating an example of the state where light from outside is irradiated onto a projection surface at the time of image projection, which has been examined by the inventors of the present invention.

External light 701 illustrated in FIG. 5 is light from outside such as light from a fluorescent lamp or an incandescent lamp or solar light, and is a light source different from the illuminations 103 and 104. If the external light 701 is heavily irradiated onto the projection surface 301, shadows 703 and 704 respectively formed by the illuminations 103 and 104 have lost their shapes or fade and a light-dark contrast from surroundings becomes less distinguishable.

Consequently, phenomena of failing to accurately catch the shapes by the camera 102 and failing to accurately detect the contact position of a finger 702 on the projection surface 301 by the finger contact position detection unit 105 occur.

Thus, the operation detection apparatus 100 illustrated in FIG. 1 performs a region specifying and presentation process. The region specifying and presentation process specifies a region where the contact position of the finger 702 on the projection surface 301 cannot be accurately detected due to the external light 701 or the like as illustrated in FIG. 5, that is, a region where operation information of a finger is undetectable. Then, the specified region is presented to the user, and a guide for encouraging an improvement is displayed.

In this manner, when operation information of a finger is undetectable, an undetectable location on the projection surface can be clearly shown to the user, so that the operability can be improved.

<Process Example of Region Specifying and Presentation Process>

Figure 6:
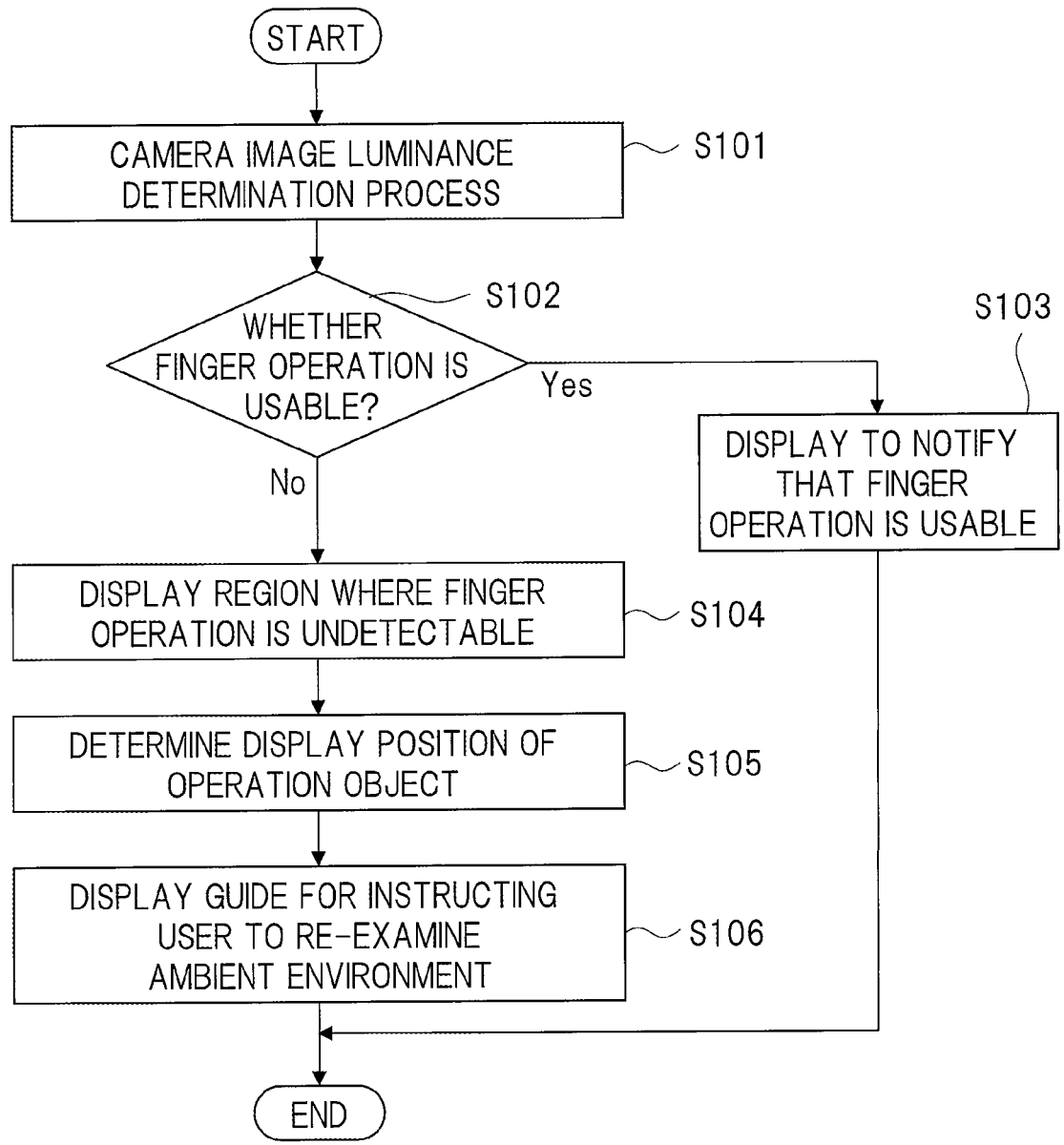
FIG. 6 is a flowchart illustrating an example of a region specifying and presentation process by the operation detection apparatus illustrated in FIG. 1.

FIG. 6 is a flowchart illustrating an example of the region specifying and presentation process by the operation detection apparatus 100 illustrated in FIG. 1.

FIG. 6 illustrates a flow including a series of processes in steps S101 to S106 each executed once, but this flow is continuously repeated in practice. Accordingly, after the process in step S103 or S106, the flow returns to the process in step S101 again.

The flowchart illustrated in FIG. 6 is always executed while the power to the operation detection apparatus 100 is turned on, for example, before the user starts to use the operation detection apparatus 100 and during the use of the operation detection apparatus 100.

Accordingly, even when an ambient environment of the operation detection apparatus 100 has suddenly changed, for example, when luminance of external light has suddenly changed while the user is using the operation detection apparatus 100, an effect can be obtained.

Also, the flowchart illustrated in FIG. 6 may be executed only when a finger operation function by the user is used. Namely, when the finger operation function by the user has been invalidated and the operation target device 150 is used only for the purpose of projecting a video, the process illustrated in FIG. 6 is not performed. In this manner, it is possible to achieve an effect of reducing the process load and power consumption of a CPU, that is, the control unit 153 or the like in the operation detection apparatus 100.

First, the operation detectable region specifying unit 107 performs the process of determining whether an operation with a finger is detectable based on image data of the projection surface 301 captured by the camera 102 (step S101).

An example of the determination process includes a determination technique using a luminance level. In a situation where only the illuminations 103 and 104 are turned on and the external light 701 is not irradiated at all, luminance of image data captured by the camera 102 is previously retained as data, and if luminance of image data being currently captured is higher than that of the retained data by a predetermined value (first setting value) or more, it is possible to presume that the amount of the external light 701 is large. As a result, operation information of a finger is undetectable, and it is thus possible to determine that the operation with a finger is unusable.

Alternatively, if image data is captured in the state where the illuminations 103 and 104 are temporarily turned off, that is, only the external light 701 is irradiated, and luminance of the image data at that time is higher than a predetermined value (first setting value), it is possible to determine that the amount of the external light 701 is large and the operation with a finger is unusable. This determination process will be described with reference to FIG. 7.

Subsequently, the control unit 153 determines whether a finger operation is usable based on a result of the process in step S101, that is, finger/pen operation information undetectable region data in the detection result data 102 (step S102). If it is determined that the finger operation is usable (Yes) in the process in step S102, the flow proceeds to the process in step S103.

If it is determined that the finger operation is usable in the process in step S102, the control unit 153 displays a notification that the user can use the operation with a finger via the video irradiation unit 154 in the projection range 302 (step S103), and the flow ends.

Note that the process in step S103 may not be performed initially. Namely, this may be notified to the user only when a finger operation becomes unusable once while the apparatus is in use and the finger operation then becomes usable.

On the other hand, if it is determined that the finger operation is unusable (No) in the process in step S102, the flow proceeds to the process in step S104. In this process, the control unit 153 displays a region where a finger operation is undetectable via the video irradiation unit 154 on the projection surface 301 (step S104). The display of the region where a finger operation is undetectable will be described below with reference to FIG. 8.

Subsequently, the control unit 153 determines a display position of an operation object based on the region where a finger operation is undetectable (step S105). The determination of the display position will be described below with reference to FIGS. 9 and 10. The operation object mentioned here represents a display of a message to the user and an operation menu icon to be projected onto the projection surface 301.

Then, the control unit 153 performs guide display for encouraging the user to re-examine an ambient environment in which the operation detection apparatus 100 has been set, via the video irradiation unit 154 to the projection surface 301 (step S106). Note that the guide display will be described below with reference to FIGS. 8 and 9.

In the above-described manner, the region specifying and presentation process by the operation detection apparatus 100 ends. After the process in step S106 ends, the flow returns to the process in step S101 again, and the flow illustrated in FIG. 6 is repeated.

If the user selects continuation of the process without re-examining the ambient environment after the process in step S106, the flow ends without returning to step S101.

<Example of Process in Step S101 and Configuration Example of Operation Detection Determination Table>

Subsequently, determination process in step S101 illustrated in FIG. 6 will be additionally described.

FIG. 7 is an explanatory view illustrating a configuration example of an operation detection determination table 900 used in the process in step S101 in the flowchart illustrated in FIG. 6.

The operation detectable region specifying unit 107 determines whether an operation with a finger is detectable by the use of the operation detection determination table 900 illustrated in FIG. 7. The operation detection determination table 900 is stored in a storage unit (not illustrated) or the like included in the operation detectable region specifying unit 107.

The operation detection determination table 900 includes an index number 901, a finger operation detection accuracy 902, a luminance level 903, a reference luminance difference 904, and a display color 905 as illustrated in FIG. 7.

The index number 901 represents an index number of the operation detection determination table 900. The finger operation detection accuracy 902 is an index representing a detection accuracy of an operation with a finger. Since the detection accuracy of the operation with a finger becomes higher as the numerical value of the index becomes larger, the value of 3 indicates that the finger operation is most detectable and the value of 0 indicates that the finger operation is least detectable.

In the example of the operation detection determination table 900 illustrated in FIG. 7, the value of 3 indicates that the operation with a finger can be detected, and the other values of 2 to 0 indicate that the operation with a finger cannot be detected.

The luminance level 903 is associated with the finger operation detection accuracy 902, and represents a range of a luminance level value of image data captured by the camera 102. The luminance level value is expressed by 256 levels from 0 to 255 as an example, and indicates that the image data is the brightest when the luminance level value is 255 and that the image data becomes darker as the luminance level value comes closer to 0.

Accordingly, it is determined that the image data is more affected by external light as the luminance level value comes closer to 255, and the finger operation detection accuracy 902 comes close to 0. On the other hand, it is determined that the image data is less affected by external light as the luminance level value comes closer to 0, and the finger operation detection accuracy 902 comes close to 3.

The reference luminance difference 904 is associated with the finger operation detection accuracy 902, and represents a range of a value taken as a difference between the luminance level value of the image data captured by the camera 102 and a reference luminance level value retained in the apparatus. The reference luminance level value retained in the apparatus is a value in a case where the image data is not affected by external light, and thus can be used to guess how the image data is affected by external light by comparison with a luminance level value of image data captured in a usage environment.

Accordingly, it is determined that the image data is more affected by external light as a value of the reference luminance difference 904 becomes larger, and the finger operation detection accuracy 902 comes close to 0. Meanwhile, it is determined that the image data is less affected by external light as a value of the reference luminance difference 904 becomes smaller, and the finger operation detection accuracy 902 comes close to 3.

Note that the finger operation detection accuracy 902 may be determined based on a condition of either one of the luminance level 903 and the reference luminance difference 904, or may be determined based on anyone of an AND (logical product) condition, an OR (logical add) condition, and an XOR (exclusive logical add) condition of both the luminance level 903 and the reference luminance difference 904.

The display color 905 represents a color displayed on the projection surface 301 in association with the finger operation detection accuracy 902. The color represented by the display color 905 is displayed on the projection surface 301 for the region where an operation with a finger is undetectable determined in the process in step S105 illustrated in FIG. 6, in other words, in accordance with the value of the finger operation detection accuracy 902.

Note that colors respectively represented in the display color 905 are expressed by screening, dots and hatching in FIG. 7. When the value of the finger operation detection accuracy 902 is 3, the display color 905 is set to be colorless, for example. Alternatively, the display color 905 may be expressed by a single color instead of different colors. In this case, the display color 905 is expressed by color density.

Note that FIG. 7 illustrates an example of a table having four entries, but a table having a different number of entries may be used. If the table is set so as to satisfy the condition of the number of entries ≥2, respective areas where an operation with a finger is detectable and is undetectable can be specified.

Accordingly, the number of entries, that is, the number of indexes of the operation detection determination table 900 is not limited as long as the number of entries ≥2 is satisfied. Note that this determination process may be applied to all pixels within the projection range 302 on the projection surface 301, or may be applied to only some of the pixels. Further, this determination process may be applied after calculation of an average value or the like is performed for a set of collected m×n pixels. Here, m and n are respectively any integer values.

<Example of Display of Region where Finger Operation is Undetectable and Guide Display to User>

Subsequently, display on the projection surface 301 related to the processes in step S103 to step S106 in the flowchart illustrated in FIG. 6 will be described below with reference to FIGS. 8 to 10.

FIG. 8 is an explanatory view illustrating an example of display of a region where a finger operation is undetectable and a guide display to a user by the operation detection apparatus 100 illustrated in FIG. 1.

FIG. 8(*a*) illustrates a display example on the projection surface 301 for guiding re-examination of an ambient environment to the user after the region where an operation with a finger is undetectable is specified in the process in step S104 and the process in step S106 illustrated in FIG. 6.

In FIG. 8, a region 1000 represents a region where an operation with a finger is undetectable, and is displayed so that the user understands detection accuracy by using the color expression defined in the display color 905 illustrated in FIG. 7. A region 1001 represents a region where an operation with a finger is detectable, and is displayed in a color defined in the display color 905 illustrated in FIG. 7. A guide display 1002 represents display for encouraging the user to improve a usage environment.

When regions where an operation with a finger is detectable and is undetectable are respectively colored in different colors and presented to the user in the region 1000 and the region 1001, different colors may be applied to each pixel or different colors may be applied to each set of collected a×b pixels. Here, a and b are respectively any integer values.

Furthermore, different colors may be applied to each of a predetermined number of regions obtained by dividing the projection range 302. When different colors are applied to each set of collected a×b pixels or to each of the plurality of regions obtained by dividing the projection range 302, the amount of information notified to the user can be reduced. Thus, the user easily recognizes a current state, and as a result, user convenience can be enhanced.

FIG. 8(*b*) illustrates a display example in a case where a user has re-examined a usage environment by, for example, blocking solar light with a curtain and a certain degree of improvement has been made from the state illustrated in FIG. 8(*a*).

It is observed that a part of the region 1000 where an operation with a finger is undetectable illustrated in FIG. 8(*a*) is changed into the region 1001 where an operation is detectable, and a detection accuracy of the region 1000 where an operation is undetectable is improved.

FIG. 8(c) illustrates a display example in a case where a user has further re-examined a usage environment and a further improvement has been made from the state illustrated in FIG. 8(b), so that the region 1000 where an operation with a finger is undetectable has been completely eliminated from the projection range 302.

The region 1000 where an operation with a finger is undetectable is entirely changed into the region 1001 where an operation is detectable, and the guide display 1002 is changed to a sentence indicating that an operation with a finger can be detected in an entire region of the projection range 302.

<Another Example of Guide Display>

FIG. 9 is an explanatory view illustrating another example of the display of a region where a finger operation is undetectable and the guide display to the user by the operation detection apparatus 100 illustrated in FIG. 1.

FIG. 9 illustrates an example in which display positions of the guide display 1002 to the user and an operation button display 1100 are made variable depending on the region where an operation with a finger is undetectable in the process in step S105 and the process in step S106 illustrated in FIG. 6.

In this case, the guide display 1002 and the operation button display 1100 are displayed within the region 1001 where an operation with a finger is detectable while avoiding the region 1000 where an operation with a finger is undetectable as illustrated in FIGS. 9(a) and 9(b).

This can solve the problem of inability to select an operation button by a finger operation and the problem of making it difficult to see the display due to the overlap between the display of a region where an operation with a finger is undetectable and the user message display. As a result, user convenience can be improved.

In this case, the guide display 1002 may be displayed on any coordinates on the projection surface 301, and only the operation button display 1100 by which the user operates the projection surface 301 with his/her finger or gesture may be displayed within the region 1001 where an operation with a finger is detectable.

<Display Example of Operation Menu Icon or the Like>

FIG. 10 is an explanatory view illustrating an example of display of a region where a finger operation is undetectable, a guide display to the user, and display of an operation menu icon by the operation detection apparatus 100 illustrated in FIG. 1.

FIG. 10 illustrates a display example in which a display position of an operation menu icon 1200 is made variable depending on the region where an operation with a finger is undetectable in the process in step S105 and the process in step S106 illustrated in FIG. 6.

As illustrated in each of FIGS. 10(a) and 10(b), the operation menu icon 1200 is displayed within the region 1001 where an operation with a finger is detectable while avoiding the region 1000 where an operation with a finger is undetectable.

This can solve the problem of inability to select the operation menu icon 1200 by a finger operation and the problem of making it difficult to see the display of the menu icon due to the overlap between the display of a region where an operation with a finger is undetectable and the menu icon. As a result, user convenience can be improved.

Note that, if the region where an operation with a finger is undetectable is wide and the region where the guide display 1002 to the user is displayed is insufficient, the guide display may be displayed by reducing the font size thereof only in that case.

Alternatively, a notification may be made to the user by an icon by projecting the icon from the video irradiation unit 154. Also, the notification may be made to the user by displaying a guide on the display unit 155. Further, the notification may be made to the user by outputting a voice guide and a sound effect from the audio output unit 157.

Furthermore, if the region where an operation with a finger is undetectable is wide and the region where the operation menu icon 1200 is displayed is insufficient, the operation menu icon 1200 may also be similarly displayed by reducing the display size thereof. Alternatively, the icons may be displayed by reducing the number of types thereof to a minimum number.

This can solve the problem of inability to display the guide display 1002 to the user due to the region where an operation with a finger is undetectable being too wide. As a result, user convenience can be improved.

As described above, the user can re-examine the usage environment of the operation target device while recognizing the region where operation information of a finger is undetectable and confirming an improvement status of the region. Thus, user convenience for the operation detection apparatus 100 can be improved.

Second Embodiment

<Outline>

In the second embodiment, a process of adjusting a projection range of video projection to exclude the region where operation information of a finger is undetectable from the projection surface when the region where operation information of a finger is undetectable is present or when it is difficult to eliminate the region where operation information of a finger is undetectable from the projection surface in the operation detection apparatus 100 will be described. This process is performed by the control unit 153 based on finger/pen operation information undetectable region data in the detection result data 120.

<Display Example of Operation Menu Icon or the Like>

FIG. 11 is an explanatory view illustrating an example of display of a region where a finger operation is undetectable, a change in a projection range, and display of an operation menu icon by the operation detection apparatus 100 illustrated in FIG. 1.

FIG. 11 illustrates an example of a projection surface in a case where the region where operation information of a finger is undetectable has been eliminated from the projection surface by changing the projection range.

For example, as illustrated in FIG. 11(a), a region where operation information of a finger is undetectable like the region 1000 is present within the projection range 302 on the projection surface in some cases. In such a case, the region where operation information of a finger is undetectable can be excluded from the projection range 302 by changing the projection range 302 so as to avoid the region 1000 as illustrated in FIG. 11(b).

This process may be automatically performed when the presence of the region where operation information of a finger is undetectable is detected, or may be performed only when a user has permitted the change in the projection range by displaying a user message 1301 and a user selection button 1302 illustrated in FIG. 11(a).

Also, display coordinates may be changed in accordance with a state of the projection surface so that the user message

1301, the user selection button 1302, and the operation menu icon 1200 illustrated in FIG. 11(*a*) are not displayed in the region 1000 where operation information of a finger is undetectable.

Furthermore, this process may be performed only when the finger operation function by the user has been validated. Meanwhile, when the finger operation function has been invalidated, even if the region where operation information of a finger is undetectable is present, this is irrelevant to user convenience. Thus, there is no problem even if a video is projected in any projection range determined by the user.

Also, in FIG. 11(*a*), the user message 1301 may be displayed on any coordinates on the projection surface, and the display coordinates may be changed in accordance with the state of the projection surface so that only the user selection button 1302 and the operation menu icon 1200 which the user operates with his/her finger or gesture are not displayed in the region 1000 where operation information of a finger is undetectable.

Furthermore, a projection size after the change may be presented to the user in advance by projecting an outer frame of the projection size so that the user knows the projection size after the change. Accordingly, the user easily determines whether the projection size is to be changed, so that convenience can be improved. In that case, the region 1000 where operation information of a finger is undetectable may not be displayed.

As described above, since it is possible to exclude the region where operation information of a finger is undetectable from the projection range by adjusting the projection range of the video when the region where operation information of a finger is undetectable is present and it is difficult to eliminate the region where operation information of a finger is undetectable from the projection range, user convenience can be improved.

Third Embodiment

<Outline>

In the third embodiment, a technique in which, when a region where operation information of a finger is undetectable is present or when a set projection range does not entirely fall within a projection object such as a desk or a wall in the operation detection apparatus 100, the region is detected by the same process based on luminance level determination and a process corresponding to each region is performed will be described.

<Configuration Example of Operation Detection Apparatus>

Figure 12:
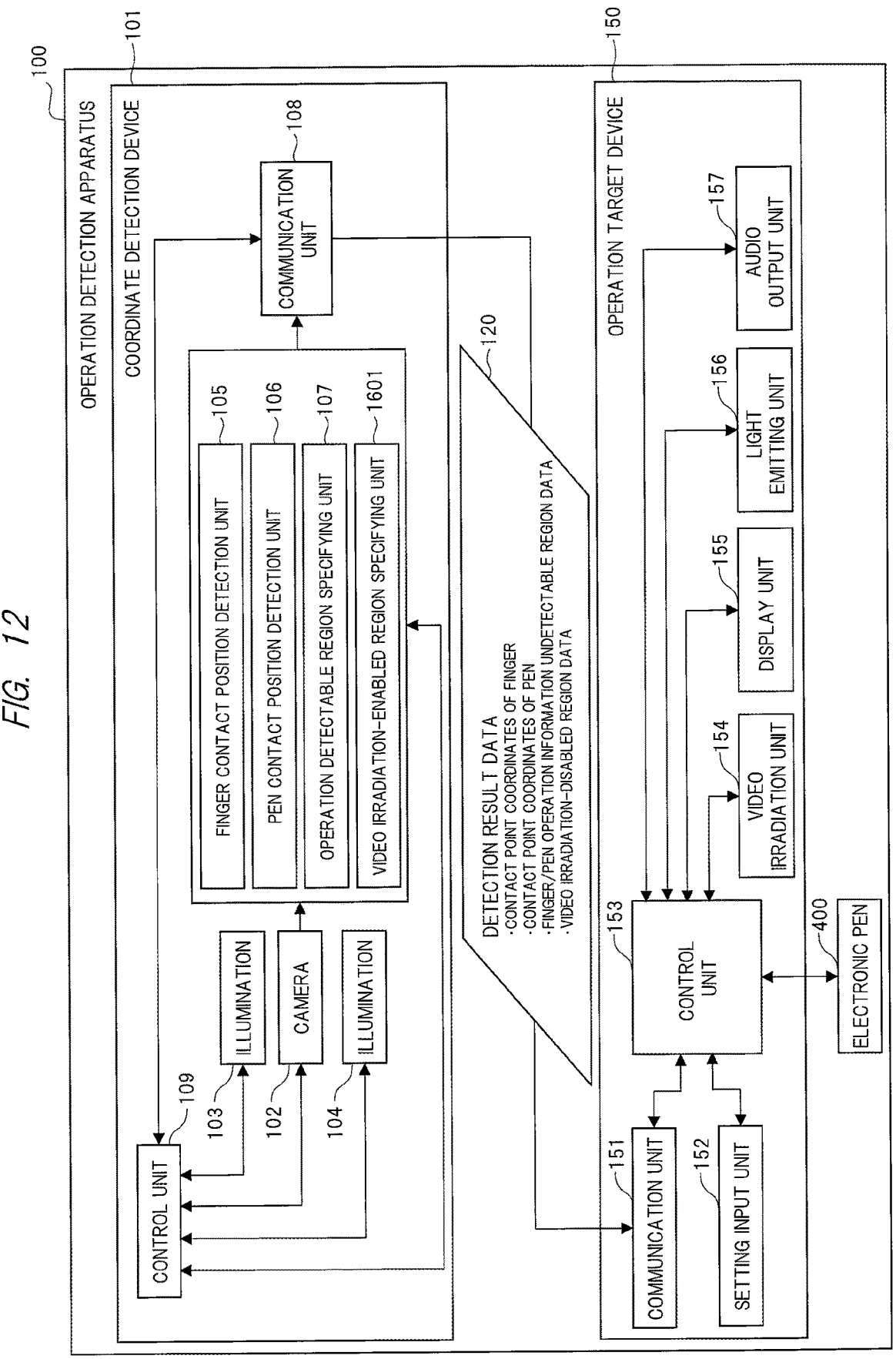
FIG. 12 is an explanatory view illustrating a configuration example of an operation detection apparatus according to a third embodiment.

FIG. 12 is an explanatory view illustrating a configuration example of an operation detection apparatus 100 according to the third embodiment.

The operation detection apparatus 100 illustrated in FIG. 12 differs from the operation detection apparatus 100 illustrated in FIG. 1 according to the first embodiment described above in that a video irradiation-enabled region specifying unit 1601 is newly added and video irradiation-disabled region data is added as the detection result data 120. The configuration other than those is similar to that illustrated in FIG. 1, and hence repetitive description thereof is omitted.

The video irradiation-enabled region specifying unit 1601 specifies a region where a video can be irradiated onto a projection object such as a desk or a wall based on image data of the projection surface 301 captured by the camera 102. The specifying technique will be described below with reference to a flowchart illustrated in FIG. 13.

Also, the video irradiation-disabled region data added to the detection result data 120 is data representing the region where a video cannot be irradiated, which has been specified by the video irradiation-enabled region specifying unit 1601, and includes positional information (for example, coordinate data) representing the region where a video cannot be irradiated, for example.

<Example of Process for Specifying Irradiation-Enabled Region>

Figure 13:
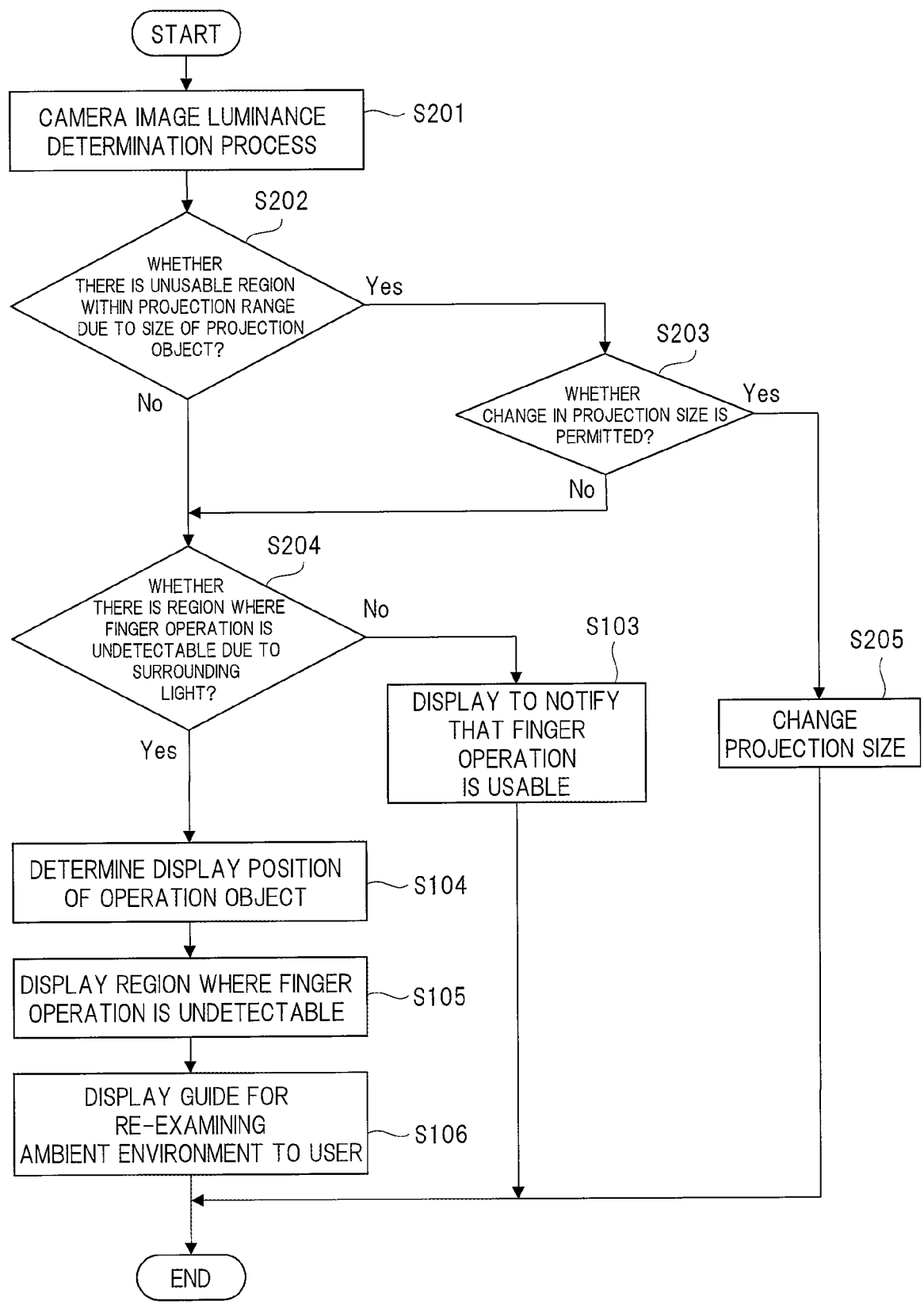
FIG. 13 is a flowchart illustrating an example of a process by the operation detection apparatus illustrated in FIG. 12.

FIG. 13 is a flowchart illustrating an example of the process by the operation detection apparatus 100 illustrated in FIG. 12. FIG. 13 illustrates a flow including a series of processes in steps S201 to S204 and steps S104 to S106 each executed once, but this flow is continuously repeated in practice, and the flow returns to the process in step S201 after the processes in step S205, step S103 and step S106.

The flowchart illustrated in FIG. 13 is always executed while the power to the operation detection apparatus 100 is turned on, for example, before the user starts to use the operation detection apparatus 100 and during the use of the operation detection apparatus 100. Thus, even if a surrounding usage environment has suddenly changed, for example, a change in luminance of external light has occurred when the user is using the apparatus, operability can be immediately improved.

Also, the flowchart illustrated in FIG. 13 may be executed only when a finger operation function by the user is used. In this manner, it is possible to achieve an effect of reducing the process load and power consumption of the control unit 153 (CPU) and others.

The processes in steps S103 to S106 illustrated in FIG. 13 are similar to the processes in steps S103 to S106 illustrated in FIG. 6, and hence repetitive description thereof is omitted.

First, the operation detectable region specifying unit 107 performs determination process based on image data of the projection surface 301 captured by the camera 102 (step S201). In the determination process in step S201, it is determined whether an operation with a finger can be detected and whether a set projection range falls within a projection object such as a desk or a wall.

As an example of the determination process, a method using a luminance level described in the process in step S101 illustrated in FIG. 6 is conceivable. Also, the process for determining whether an operation with a finger can be detected is similar to that described in the process in step S101 illustrated in FIG. 6.

As the process for determining whether a projection object such as a desk or a wall is wide relative to the set projection range, for example, a method using the same luminance level can be used. In a situation where only illuminations 103 and 104 are turned on and external light 701 is not irradiated at all, luminance of image data captured by the camera 102 is previously retained as data, and if luminance of image data being currently captured is lower than that of the retained data by a predetermined value (second setting value) or more, the region can be presumed to be a region where a projection object does not exist, that is, an unusable region. As a result, it is possible to determine that a video cannot be projected onto that region.

Alternatively, if image data is captured in the state where the illuminations 103 and 104 are temporarily turned off, that is, only the external light 701 is irradiated, and luminance of the image data at that time is lower than a predetermined value (second setting value), the region can be presumed to be an unusable region where a projection object does not exist and a video cannot be projected.

If specific numerical values are cited like those illustrated in FIG. 7, when the luminance level 903 is 0 to 49, it is possible to determine that a projection object does not exist and a video cannot be projected. Also, when the reference luminance difference 904 is −20 (minus 20) or smaller, it is similarly possible to determine that the projection object does not exist and a video cannot be projected. Further, it is also possible to determine whether the projection object does not exist and a video cannot be projected from the respective indexes of both the luminance level 903 and the reference luminance difference 904.

Subsequently, the control unit 153 determines whether an unusable region is present (step S202). In the process in step S202, the control unit 153 determines whether a video can be projected in a set projection range based on the process result by the process in step S201. Also, as the process result in step S202, for example, the finger/pen operation information undetectable region data and the video irradiation-disabled region data in the detection result data 120 are used.

Then, when it is determined that the video cannot be projected in the set projection range (Yes), the control unit 153 determines whether the user has permitted the change into a projection range newly determined so that the projection object exists for an entire region of the projection range 302 via the setting input unit 152 (step S203).

When the user has permitted the change of the projection range (Yes), the control unit 153 newly determines a projection range so that the projection object exists for the entire region of the projection range 302, changes the projection range, and irradiates the video via the video irradiation unit 154 (step S205).

Meanwhile, when the user does not permit the change of the Projection range (No) in the process in step S203 or when it is determined that the video can be projected in the projection range set in the process in step S202 (No), the control unit 153 determines whether a region where an operation with a finger is undetectable due to surrounding light such as external light is present (step S204).

When the control unit 153 determines that the region where an operation with a finger is undetectable due to surrounding light such as external light is present (Yes) in the process in step S204, the flow proceeds to the process in step S104.

Meanwhile, when the control unit 153 determines that the region where an operation with a finger is undetectable due to surrounding light such as external light is not present (No) in the process in step S204, the flow proceeds to the process in step S103. For the following processes in steps S103 to S106, processes similar to those described in FIG. 6 are performed.

<Example of Video Display onto Desk>

Figure 14:
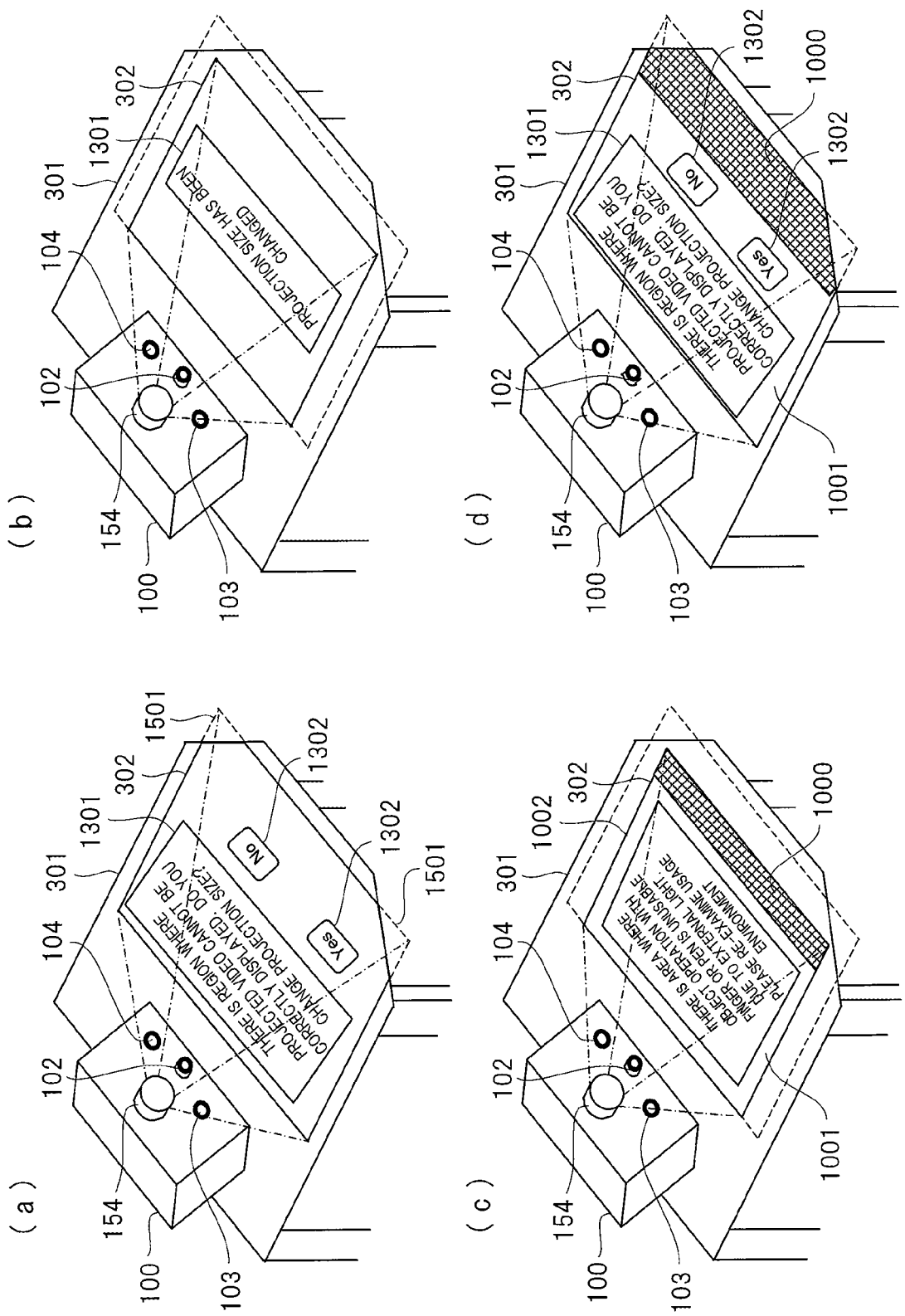
FIG. 14 is an explanatory view illustrating an example of video display at the time of video projection onto a desk by the operation detection apparatus illustrated in FIG. 12.

FIG. 14 is an explanatory view illustrating an example of video display at the time of video projection onto a desk by the operation detection apparatus 100 illustrated in FIG. 12.

FIG. 14(a) corresponds to the processes in steps S202 and S205 illustrated in FIG. 13, and illustrates the state where a part of the region of the projection range 302 is not present on the projection surface 301 when a video is projected onto the desk from the operation detection apparatus 100 and thus a region 1501 cannot be correctly projected onto the desk.

Then, a process for determining a new projection range is performed when the user operates the user selection button 1302 for selecting whether the projection size is changed. FIG. 14(b) illustrates a state where the user selects the user selection button 1302 of "Yes" and the projection range has been adjusted to the projection range 302.

Then, when the process flow illustrated in FIG. 13 is executed again from the beginning and the process in step S204 illustrated in FIG. 13 is performed, the region 1000 where an operation with a finger is undetectable is presented and the guide display 1002 for encouraging the user to re-examine a usage environment is displayed as illustrated in FIG. 14(c). Also, FIG. 14(d) illustrates an example in which the region 1000 where an operation with a finger is undetectable is displayed on the projection range 302 at the time illustrated in FIG. 14(a), that is, before the projection range 302 is adjusted.

As can be seen from the comparison between FIG. 14(c) and FIG. 14(d), the region 1000 where an operation with a finger is undetectable has been changed by adjusting the projection range 302.

Accordingly, there is a possibility that the region 1000 where an operation with a finger is undetectable becomes smaller when the video projection range is made small. On the other hand, there is a possibility that the region 1000 where an operation with a finger is undetectable becomes larger when the video projection range is made large.

Therefore, if both the region where an operation with a finger is undetectable and the region where a projection object such as a desk does not exist are specified, the projection range is first adjusted, and the region where an operation with a finger is undetectable is then displayed to present a guide for improving a usage environment to the user. In this manner, it is possible to prevent unnecessary information from being presented to the user, and user convenience can be enhanced.

The case where the region where a projection object such as a desk does not exist is detected has been described in the third embodiment. Alternatively, if an obstacle which interrupts the video projection is detected, the projection range may be adjusted so as to exclude the obstacle from the projection range.

As a method for detecting the obstacle, for example, a method in which a threshold value of the luminance level 903 and a threshold value of the reference luminance difference 904 for obstacle detection are previously set and the presence of the obstacle is determined by the comparison with the set threshold values is conceivable. In this manner, user convenience can be improved like the case where a projection object does not exist.

In the above-described manner, the region where operation information of a finger is undetectable and the region where an image cannot be projected because a projection object does not exist can be simultaneously specified by using the same determination process. Accordingly, it is possible to reduce the time period required to perform the process, and it is possible for the user to shorten the time period from when the power to the apparatus is turned on to when the apparatus becomes usable. Further, since a time period during which the use of the apparatus is stopped can be shortened even if the apparatus is in use, user convenience can be improved.

Fourth Embodiment

<Configuration Example of Operation Detection Apparatus>

Figure 15:
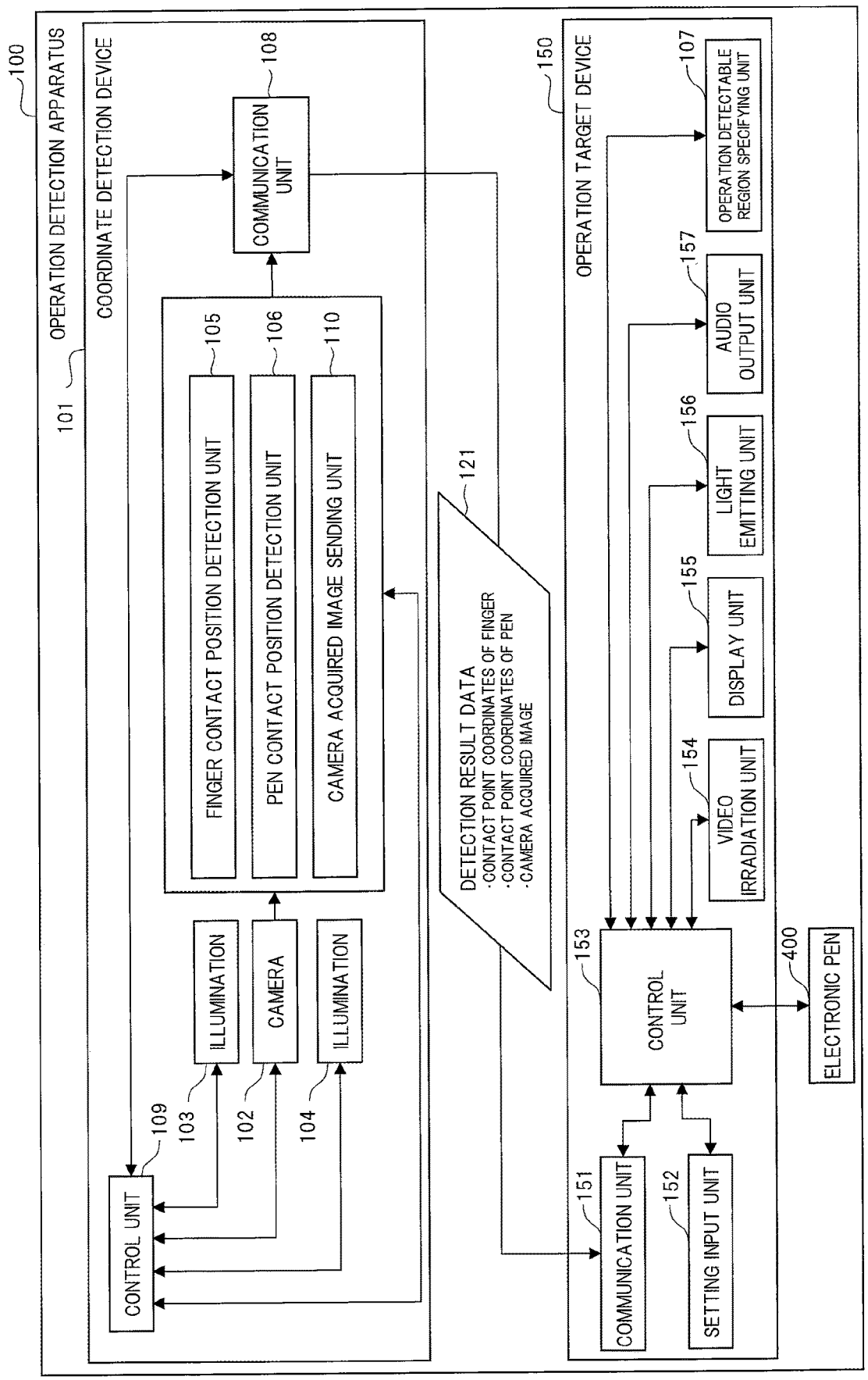
FIG. 15 is an explanatory view illustrating a configuration example of an operation detection apparatus according to a fourth embodiment.

FIG. 15 is an explanatory view illustrating a configuration example of an operation detection apparatus 100 according to the fourth embodiment.

The operation detection apparatus 100 illustrated in FIG. 15 differs from the operation detection apparatus 100 illustrated in FIG. 1 in that the operation detectable region specifying unit 107 is provided in the operation target device 150 instead of the coordinate detection device 101 and a camera acquired image sending unit 110 is newly added to the coordinate detection device 101. In addition, the detection result data 121 to be transmitted and received between the coordinate detection device 101 and the operation target device 150 also differs.

The camera acquired image sensing unit 110 is controlled by the control unit 109. The camera acquired image sending unit 110 transmits a camera acquired image captured by the camera 102 as a part of the detection result data 121 to the operation target device 150 via the communication unit 108.

The operation detectable region specifying unit 107 performs a process similar to that performed by the operation detectable region specifying unit 107 included in the coordinate detection device 101 illustrated in FIG. 1. Namely, the operation detectable region specifying unit 107 receives the camera acquired image from the communication unit 151 based on control from the control unit 153 and specifies the region where operation information of a finger is detectable based on the image data.

Also in the operation detection apparatus 100 configured as described above, the function and effect similar to those in the aforementioned first embodiment can be achieved.

Fifth Embodiment

While the operation detection apparatus 100 illustrated in FIG. 1 according to the first embodiment described above is configured to use one camera and two illuminations for detecting the contact point coordinates of an electronic pen or the contact point coordinates of a finger, another configuration example will be described in the fifth embodiment.

<Configuration Example of Operation Detection Apparatus>

FIG. 16 is an explanatory view illustrating a configuration example of an operation detection apparatus 100 according to the fifth embodiment.

The operation detection apparatus 100 illustrated in FIG. 16 is configured of the operation target device 150, the camera 102, an electromagnetic wave generation device 600, and a control device 601. In the operation detection apparatus 100 illustrated in FIG. 16, an object to be detected is a finger in FIG. 16(a), and an object to be detected is the electronic pen 400 in FIG. 16(b).

The electromagnetic wave generation device 600 is attached to an upper part of the projection surface 301 or the like and irradiates an electromagnetic wave in a wavelength region including infrared rays. The electromagnetic wave is projected onto a plane so as to be parallel to the projection surface 301 and along the projection surface 301, and a position of the object is detected by capturing the electromagnetic wave reflected by an object, which has approached the projection range 302, by the camera 102. The electromagnetic wave to be irradiated may be visible light such as red light.

The control device 601 controls respective operations of the camera 102, the operation target device 150, and the electromagnetic wave generation device 600. Also, components of the operation target device 150, the camera 102, the electromagnetic wave generation device 600, and the control device 601 may be respectively configured as separate members as illustrated in FIG. 16, or a device in which all or some of the components are integrated may be substituted for the components illustrated in FIG. 16.

In the manner described above, it is possible to detect an operation with the finger of a user on the projection range 302, output appropriate information from the operation target device 150, and operate and control the operation target device 150.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the first to fifth embodiments, the user message display projected from the video irradiation unit 154 illustrated in FIGS. 8 to 11 may be notified to the user by an icon projected from the video irradiation unit 154.

Alternatively, the user message may be notified to the user by displaying a message on the display unit 155. Further, the user message may be notified to the user by outputting a voice message or a sound effect from the audio output unit 157. Even if any of the means described above is used, a similar effect can be obtained.

Note that the aforementioned embodiments have been described in detail to make the present invention easily understood, and the present invention is not limited to that including all the described components. Also, for a part of the configuration of each of the embodiments, addition of another configuration, deletion, and replacement are possible. Further, some or all of the aforementioned configurations, functions, processing units, processing means, and the like may be implemented by hardware designed with integrated circuits and the like.

In addition, control lines and information lines considered to be required in the description are illustrated, and all control lines and information lines on a product are not necessarily illustrated. In practice, almost all of the components may be considered to be connected to one another.>

REFERENCE SIGNS LIST

100 Operation detection apparatus
101 Coordinate detection device
102 Camera
103 Illumination
104 Illumination
105 Finger contact position detection unit
106 Pen contact position detection unit
107 Operation detectable region specifying unit
108 Communication unit
109 Control unit
110 Camera acquired image sending unit
120 Detection result data
121 Detection result data
150 Operation target device
151 Communication unit
152 Setting input unit
153 Control unit
154 Video irradiation unit
155 Display unit
156 Light emitting unit
157 Audio output unit
301 Projection surface
302 Projection range
400 Electronic pen
401 Light emitting element
402 Tip contact detection unit
403 Light emission control unit
600 Electromagnetic wave generation device 601 Control device
900 Operation detection determination table

The invention claimed is:

1. A projection video display apparatus controllable by a user operation of an object on a projection surface, the projection video display apparatus comprising:
   a projector configured to project a display video onto the projection surface;
   a camera configured to capture the projection surface;
   a user operation detector configured to detect the object, via the projection surface, based on the image data captured by the camera; and
   an operable region specifying circuit configured to specify each of a first region where the object is detectable and a second region where the object is undetectable in a range in which the display video is projected on the projection surface, based on luminance levels of the image data captured by the camera
   wherein an area of the first region and an area of the second region are changed by an influence of irradiation of external light, and
   wherein the projector is configured to project the display video in which the first region is displayed so as to be distinguished from the second region, and to change a display position of the object so that the object is displayed within a range of the first region where the object via the project surface is detectable.

2. The projection video display apparatus according to claim 1,
   wherein, when an input video input from outside is projected from the projector and displayed, the projector is further configured to change a range occupied by the input video in the display video based on the first region specified by the operable region specifying circuit.

3. The projection video display apparatus according to claim 1,
   wherein the operable region specifying circuit is further configured to specify a region where the luminance level is higher than a first setting value as the first region and to specify a region where the luminance level is lower than the first setting value as the second region.

4. The projection video display apparatus according to claim 3,
   wherein the operable region specifying circuit is further configured to group the second region where the object via the projection surface is undetectable in accordance with the luminance level, and
   the projector is configured to display the second region grouped by the operable region specifying circuit in the display video so that the second region is identified for each group.

5. The projection video display apparatus according to claim 1,
   wherein the operable region specifying circuit is further configured to detect a region having the luminance level lower than a second setting value as an unusable region where the projection surface does not exist, and
   the projector is configured to set a projection range so that the video is not projected onto the unusable region based on a detection result of the operable region specifying circuit.

6. The projection video display apparatus according to claim 1,
   wherein the detector is configured to detect a contact position of at least one of a finger and an electronic pen, and to detect the object via the projection surface based on the detected contact position.

* * * * *